US 6,538,751 B2

(12) United States Patent
Ono

(10) Patent No.: US 6,538,751 B2
(45) Date of Patent: Mar. 25, 2003

(54) IMAGE CAPTURING APPARATUS AND DISTANCE MEASURING METHOD

(75) Inventor: Shuji Ono, Kaisei-Machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 37 days.

(21) Appl. No.: 09/784,028

(22) Filed: Feb. 16, 2001

(65) Prior Publication Data

US 2001/0021011 A1 Sep. 13, 2001

(30) Foreign Application Priority Data

Feb. 16, 2000 (JP) .................................. 2000-037771
Aug. 16, 2000 (JP) .................................. 2000-247034
Sep. 11, 2000 (JP) .................................. 2000-275176

(51) Int. Cl.[7] .............................................. G01B 11/14
(52) U.S. Cl. .................... 356/614; 356/622; 356/623; 356/624; 356/602; 356/3.1
(58) Field of Search .................... 356/614, 622, 356/623, 624, 602, 3.1, 4.1; 250/559.22, 559.23, 559.29, 559.31

(56) References Cited

U.S. PATENT DOCUMENTS 4,988,202 A * 1/1991 Nayar et al. ............... 356/394
5,054,926 A * 10/1991 Dabbs et al. ............... 356/345
5,245,671 A * 9/1993 Kobayashi et al. ............ 382/8
6,181,424 B1 * 1/2001 Okabayashi et al. ........ 356/376

FOREIGN PATENT DOCUMENTS

JP 61155909 7/1986
JP 62046207 2/1987
JP 63233312 9/1988

OTHER PUBLICATIONS

Kawakita M. et al., "Development of Axi–Vision Camera", NHK Science & Technical Research Laboratories, 1–10–11 Kinuta, Setagaya–ku, Tokyo, University of Toronto, Toronto, Ontario, Canada, M5S 1A4.

Inokuchi, Seiji et al. (Shokodo Co., Ltd.), "Three–dimensional image measurement" ("3D Imaging Techniques for Measurement"), published in Japan in 1990.

* cited by examiner

Primary Examiner—Georgia Epps
Assistant Examiner—M. Hasan
(74) Attorney, Agent, or Firm—Birch, Stewart, Kolasch & Birch, LLP

(57) ABSTRACT

An image capturing apparatus for obtaining information regarding a depth of a subject includes: an illumination unit operable to cast a first illumination light beam mainly having a first wavelength and a second illumination light beam mainly having a second wavelength and a third wavelength from optically different emission positions onto the subject, the second and third wavelengths being different from the first wavelength; and a depth calculator operable to calculate a depth-direction distance to the subject based on outgoing light beams from the subject.

46 Claims, 28 Drawing Sheets

IMAGE CAPTURING APPARATUS AND DISTANCE MEASURING METHOD

This patent application claims priority based on a Japanese patent applications Nos. 2000-37771 filed on Feb. 16, 2000, 2000-247034 filed on Aug. 16, 2000 and 2000-275176 filed on Sep. 11, 2000, the contents of which are incorporated herein by reference.

BACKGROUND OF THE INVENTION

1. Field of the Invention

The present invention relates to an image capturing apparatus and a distance measuring method for obtaining information regarding a depth-direction distance of a subject. More particularly, the present invention relates to an image capturing apparatus and a distance measuring method for obtaining the information regarding the depth-direction distance of the subject by capturing outgoing light beams from the subject that is illuminated with light.

2. Description of the Related Art

As a method for obtaining information regarding a distance to an object or information regarding a position of the object, a three-dimensional image measuring method is known in which light having a pattern of, for example, a slit or a stripe, is cast onto the object and the pattern cast onto the object is captured and analyzed. There are a slit-light projection method (light cutting method) and a coded-pattern light projection method as typical measuring methods, which are described in detail in "Three-dimensional image measurement" by Seiji Inokuchi and Kosuke Sato (Shokodo Co., Ltd.).

Japanese Patent Application Laid-open No. 61-155909 (published on Jul. 15, 1886) and Japanese Patent Application Laid-open No. 63-233312 (published on Sep. 29, 1988) disclose a distance measuring apparatus and a distance measuring method in which light beams are cast onto a subject from different light-source positions and the distance to the subject is measured based on the intensity ratio of the reflected light beams from the subject.

Japanese Patent Application Laid-open No. 62-46207 (published on Feb. 28, 1887) discloses a distance detecting apparatus that casts two light beams having different phases onto the subject and measures the distance to the subject based on the phase difference between the light beams reflected from the subject.

Moreover, "Development of Axi-Vision Camera", Kawakita et al., 3D Image conference '99, 1999, discloses a method for measuring the distance to the subject in which the subject that is illuminated with light having the intensity modulated at a very high speed is captured by a camera having a high-speed shutter function, and the distance to the subject is measured from the degree of the intensity modulation that varies depending on the distance to the subject.

The conventional measuring method using light projection measures the distance to a region of the subject onto which the projection pattern is projected based on the principle of trigonometrical measurement. Thus, in order to obtain a high resolution in the distance measurement, it is necessary to arrange a projection optical system at a position sufficiently distant from a capturing optical system in principle, thus increasing the size of the measuring apparatus inevitably. Moreover, since an optical axis of the projection optical system is apart from that of the capturing optical system, there is a shadow region in which the projected pattern cannot be viewed because of the shadow of the subject when the region is viewed from the capturing optical system, thereby generating a "blind region" from which distance information cannot be obtained.

In the distance measuring apparatus and the distance measuring method disclosed in Japanese Patent Applications Laid-open Nos. 61-155909 and 63-233312, the time difference occurs in the measurement because it is necessary to successively cast the light from the different emission positions to measure the reflected light beams. Thus, in a case of the moving subject, the distance cannot be measured. In addition, during a time period in which the position of the light source is changed to change the emission position, the measurement difference may occur because of waver of the capturing apparatus.

Moreover, in a case of using light beams having different wavelength characteristics, the light beams can be emitted simultaneously and the reflected light beams can be separated by a filter selected in accordance with the wavelength characteristics of the light beams so that the intensities of the reflected light beams can be measured. However, if the reflectivity of the object varies depending on the wavelength, the intensities of the reflected light beams are also different depending on the wavelength thereof. The difference of the reflected-light intensities between the wavelengths may cause an error when the depth-direction distance is calculated from the ratio of the intensities of the reflected light beams, thereby preventing the precise calculation of the depth-direction distance.

The distance measuring apparatus disclosed in Japanese Patent Application Laid-open No. 62-46207 requires a high-precision phase detector for detecting the phase difference. This makes the apparatus expensive and loses the simplicity of the apparatus. In addition, since this apparatus measures the phase of the reflected light beam from a point of the subject, it cannot measure the depth distribution of the whole subject.

Moreover, in the distance measuring method using the intensity modulation disclosed in "Development Axi-Vision Camera" by Kawakita et al. (3D Image Conference '99, 1999), it is necessary to perform the light modulation and the optical shutter operation at very high speed. This causes the measuring apparatus to become large and expensive and prevents the simple measurement.

SUMMARY OF THE INVENTION

Therefore, it is an object of the present invention to provide a image capturing apparatus and distance measuring method which overcomes the above issues in the related art. This object is achieved by combinations described in the independent claims. The dependent claims define further advantageous and exemplary combinations of the present invention.

According to the first aspect of the present invention, an image capturing apparatus for obtaining information regarding a depth of a subject, comprises: an illumination unit operable to cast a first illumination light beam mainly having a first wavelength and a second illumination light beam mainly having a second wavelength and a third wavelength from optically different emission positions onto the subject, the second and third wavelengths being different from the first wavelength; and a depth calculator operable to calculate a depth-direction distance to the subject based on outgoing light beams from the subject.

The illumination unit may cast the first and second illumination light beams onto the subject simultaneously. Moreover, the image capturing apparatus may further comprises: an optically converging unit operable to converge the outgoing light beams from the subject onto which the first and second illumination light beams are cast; a separation unit operable to optically separate the outgoing light beams from the subject into a first outgoing light beam having the first wavelength, a second outgoing light beam having the second wavelength and a third outgoing light beam having the third wavelength; a light-receiving unit operable to receive the first, second and third outgoing light beams that are separated by the separation unit and are converged by the optically converging unit; and a light intensity detector operable to detect intensities of the first, second and third outgoing light beams received by the light-receiving unit, wherein the depth calculator calculates the depth-direction distance to the subject by using the intensities of the first, second and third outgoing light beams.

The light-receiving unit may include three panels of solid state image sensors, while the separation unit separates the first, second and third outgoing light beams by using an optical path splitter so as to allow the first, second and third outgoing light beams to be received by the three panels of solid state image sensors, respectively. Alternatively, the light-receiving unit may include a solid state image sensor, and the separation unit may include a first optical filter that transmits light having the first wavelength, a second optical filter that transmits light having the second wavelength and a third optical filter that transmits light having the third wavelength, the first, second and third optical filter being arranged alternately on a light-receiving surface of the solid state image sensor.

The illumination unit may include a first optical filter that transmits light having a shorter wavelength than a first boundary wavelength and a second optical filter that transmits light having a longer wavelength than a second boundary wavelength. In this case, the illumination unit casts the first and second illumination light respectively transmitted by the first and second optical filters from the optically different emission positions onto the subject; the separation unit includes first, second and third optical filters that transmits light beams having the first, second and third wavelengths, respectively, the first wavelength being shorter than a shorter one of the first and second boundary wavelengths, the second and third wavelengths being longer than a longer one of the first and second boundary wavelengths; and the separation unit separates the first outgoing light beam having the first wavelength by making the outgoing light beams from the subject pass through the first optical filter of the separation unit, and separates the second light beam having the second wavelength and the third outgoing light beam having the third wavelength by making the outgoing light beams from the subject pass through the second and third optical filters of the separation unit.

The depth calculator may calculate the depth-direction distance to the subject by using a value based on the intensities of the second and third outgoing light beams and the intensity of the first outgoing light beam. The depth calculator may obtain a dummy intensity of a dummy outgoing light beam from the subject in a case where it is assumed that a light beam having the first wavelength is cast from the emission position of the second illumination light beam, based on the intensities of the second and third outgoing light beams. The depth calculator may calculate the depth-direction distance to the subject by using an averaged intensity of the second and third outgoing light beams and the intensity of the first outgoing light beam.

According to the second aspect of the present invention, an image capturing apparatus for obtaining information regarding a depth of a subject, comprises: an illumination unit operable to cast a first illumination light beam mainly having a first wavelength and a second illumination light beam mainly having second and third wavelengths that are different from the first wavelength from optically different emission positions onto the subject; and a depth calculator operable to calculate a depth-direction distance to the subject based on outgoing light beams from the subject.

The illumination unit may cast the first illumination light and the second illumination light beam simultaneously. The illumination unit may cast the first illumination light mainly having the first wavelength and the second illumination light mainly having the second and third wavelengths from the optically different emission positions onto the subject, the second wavelength being shorter than the first wavelength, the third wavelength being longer than the first wavelength. In this case, the image capturing apparatus may further comprises: an optically converging unit operable to converge outgoing light beams from the subject onto which the first and second illumination light beams are cast; a separation unit operable to optically separate the outgoing light beams from the subject into a first outgoing light beam having the first wavelength and a second outgoing light beam having the second and third wavelengths; a light-receiving unit operable to receive the first and second outgoing light beams converged by the optically converging unit; and a light intensity detector operable to detect intensities of the first and second outgoing light beams received by the light-receiving unit, wherein the depth calculator calculates the depth-direction distance to the subject by using the intensities of the first and second outgoing light beams.

The light-receiving unit may include two panels of solid state image sensors, while the separation unit optically separates an optical path of the first outgoing light beam from that of the second outgoing light beam by using an optical path splitter to allow the first and second outgoing light beams to be received by the two panels of solid state image sensors, respectively. Alternatively, the light-receiving unit may include a solid state image sensor, and the separation unit includes a first optical filter that transmits light having the first wavelength and a second optical filter that transmits light having the second and third wavelengths, the first and second optical filters being arranged alternately on a light-receiving surface of the solid state image sensor.

The depth calculator may calculate the depth-direction distance to the subject based on a ratio of the intensity of the first outgoing light beam and a half of the intensity of the second outgoing light beam.

In the image capturing apparatus according to any of the first and second aspects of the present invention, an optical axis of the illumination unit when the illumination unit casts the first and second illumination light beams may be substantially coincident with an optical axis of the capturing unit when the capturing unit captures the outgoing light beams from the subject. The light intensity detector may detect the intensities of the first and second outgoing light beams in each pixel of an image of the subject captured by the light-receiving unit, and the depth calculator calculates a depth distribution of the subject by obtaining for each pixel the depth to a region of the subject corresponding to the pixel.

In the image capturing apparatus according to any of the first and second aspects of the present invention, the first and second illumination light beam may be light beams in an infrared region, the separation unit may further include a device operable to optically separate visible light from the outgoing light beams from the subject, and the light-receiving unit may further include a solid state image sensor for visible light operable to receive the visible light that is optically separated by the separation unit and is converged by the optically converging unit.

In the image capturing apparatus according to any of the first and second aspects of the present invention, the image capturing apparatus may further comprise a controller operable to control at least one of emission periods, the intensities, and the emission positions of the first and second illumination light beams cast from the illumination unit and an exposure period of the light-receiving unit, based on at least one of the intensities of the outgoing light beams from the subject detected by the light intensity detector and the depth-direction distance to the subject calculated by the depth calculator.

According to the third aspect of the present invention, a distance measuring method for obtaining information regarding a depth of a subject, comprises: an illumination step of casting a first illumination light beam mainly having a first wavelength and a second illumination light beam mainly having second and third wavelengths from optically different emission positions onto the subject simultaneously, the second and third wavelengths being different from the first wavelength; a separation step of separating outgoing light beams obtained from the subject that is illuminated with the first and second illumination light beams into a first outgoing light beam having the first wavelength, a second outgoing light beam having the second wavelength and a third outgoing light beam having the third wavelength; a capturing step of capturing the first, second and third outgoing light beam that are separated; a light intensity detection step of detecting intensities of the first, second and third outgoing light beams that are captured; and a depth calculation step of calculating a depth-direction distance to the subject by using the intensities of the first, second and third outgoing light beams.

In the depth calculation step, the depth-direction distance to the subject may be calculated by using a value based on the intensities of the second and third outgoing light beams and the intensity of the first outgoing light beam. In the depth calculation step, a dummy intensity of a dummy outgoing light beam from the subject in a case where it is assumed that a light beam having the first wavelength is emitted from the emission position of the second illumination light beam may be obtained based on the intensities of the second and third outgoing light beams, and the depth-direction distance to the subject is calculated based on a ratio of the intensity of the first outgoing light beam and the dummy intensity. The depth-direction distance to the subject may be calculated based on a ratio of an averaged intensity of the second and third outgoing light beams and the intensity of the first outgoing light beam.

According to the fourth aspect of the present invention, a distance measuring method for obtaining information regarding a depth of a subject, comprises: an illumination step of casting a first illumination light beam mainly having a first wavelength and a second illumination light beam mainly having a second wavelength and a third wavelength from optically different emission positions onto the subject, the second wavelength being shorter than the first wavelength, the third wavelength being longer than the first wavelength; a separation step of optically separating outgoing light beams from the subject onto which the first and second illumination light beams are cast into a first outgoing light beam having the first wavelength and a second outgoing light beam having the second and third wavelengths; a capturing step of capturing the first and second outgoing light beams separated from each other; a light intensity detection step of detecting intensities of the first and second outgoing light beams; depth calculation step of calculating a depth-direction distance to the subject by using the intensities of the first and second outgoing light beams.

In the depth calculation step, the depth-direction distance may be calculated based on a ratio of the intensity of the first outgoing light beam and a half of the intensity of the second outgoing light beam.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIG. 26 is an explanatory view of the principle according to a sixth embodiment showing an information obtaining method for obtaining distance information regarding a distance to an object and the like.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Embodiment 1

Figure 1:
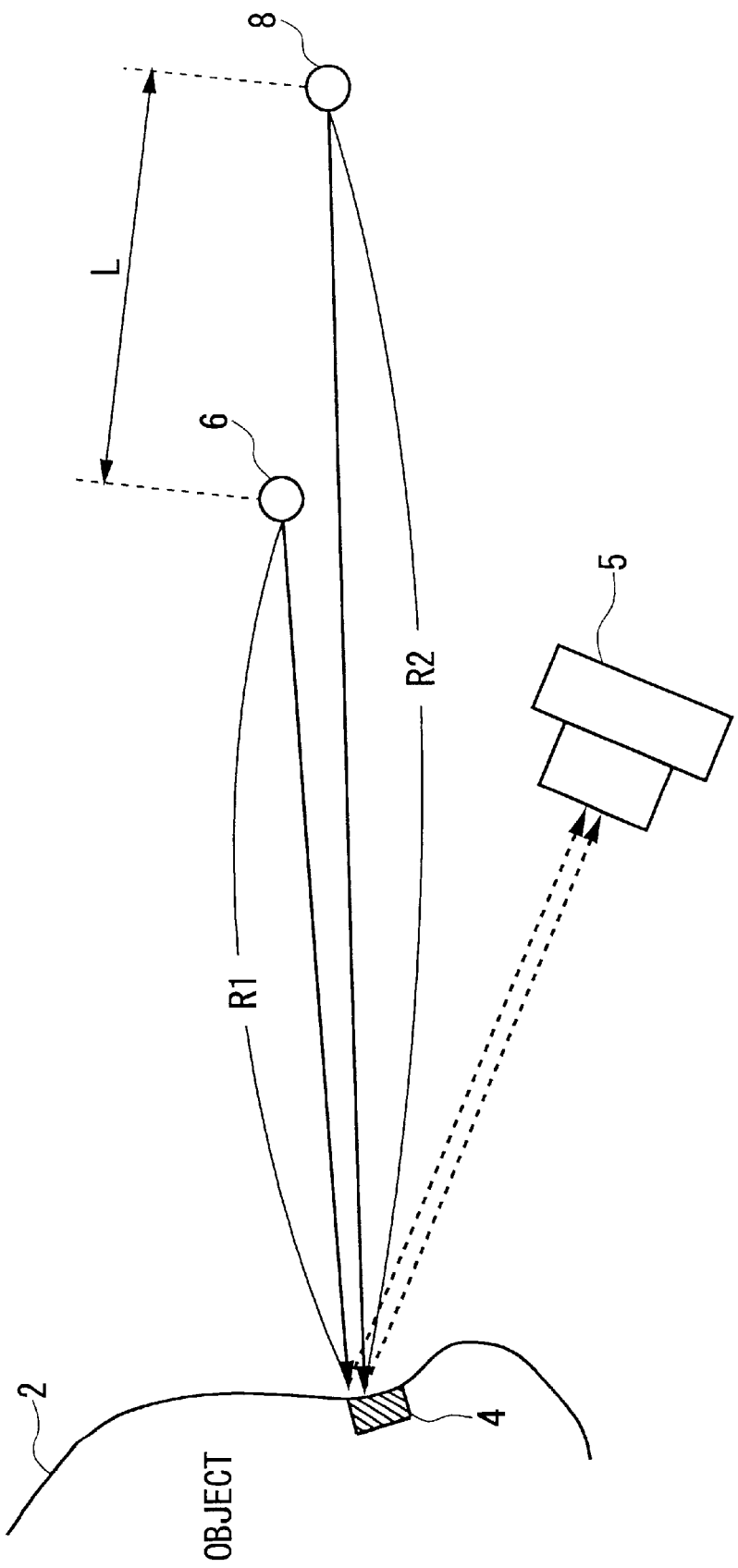
FIG. 1 is a diagram for explaining a basic principle of the present invention.

The first embodiment of the present invention is described. First, the basic principle of a measurement of a depth-direction distance to a subject from the intensity of light reflected from the subject. FIG. 1 is a drawing for explanation of the principle of the present invention. Light sources 6 and 8 are point light sources that have the same wavelength characteristics and the radiated light intensity of $I_1$ and $I_2$, respectively. The light sources 6 and 8 are arranged at positions having distances $R_1$ and $R_2$ from an object 2, respectively, in such a manner that a space between emission positions of the light sources 6 and 8 is set to be L. When the light source 6 is made to emit light, a camera 5 captures the light after being reflected from the object 2. Then, the light source 8 is made to emit light and the camera 5 captures the light of the light source 8 after being reflected from the object 2.

The light beam emitted from the light source 6 is radiated in all directions. When a sphere of radius r having the light source 6 as a center thereof is considered, the light density in an unit area of the surface of the sphere of radius r is given as $I_1/(4\pi r^2)$. Thus, when the intensity $W_1$ of light reflected from a region 4 of the object 2 located at a position apart from the light source 6 by the distance $R_1$ is $$W_1 = Rf \cdot I_1/(4\pi R_1^2)$$

where Rf is the surface reflectivity of the object 2. Similarly, the intensity $W_2$ of light reflected from the region 4 of the object 2 located at a position apart from the light source 8 by the distance $R_2$ is expressed as follows.

$$W_2 = Rf \cdot I_2/(4\pi R_2^2)$$

A ratio $W_R$ of the reflected-light intensity $W_1$ of the light of the light source 6 to the reflected-light intensity $W_2$ of the light of the light source 8 is obtained as follows.

$$W_R = W_1/W_2 = (I_1 R_2^2)/(I_2 R_1^2)$$

From this expression and the relationship $R_2 - R_1 = L$, if the space between the light emission positions of the light sources 6 and 8 is known, the distance $R_1$ can be obtained by the following expression after the reflected-light intensity ratio $W_R$ is measured.

$$R_1 = L/\{(W_R \cdot I_2/I_1)^{1/2} - 1\}$$

As described above, in a case of using the light sources both emitting the same color light, the effects of the surface reflectivity Rf are cancelled in a process for obtaining the reflected-light intensity ratio $W_R$. Thus, information regarding a depth-direction distance to the subject can be obtained. In the above-mentioned method, however, since the light sources 6 and 8 emit the light beams one by one and the camera 5 receives the light beams reflected from the subject, the time difference occurs in the image capturing. Thus, the above-mentioned method cannot be applied to a moving subject. In order to overcome this problem, a method is considered in which the light sources 6 and 8 are provided with different wavelength characteristics and are made to emit the light beams simultaneously. In this method, the light beams reflected from the light sources 6 and 8 are separated from each other by wavelength and then the intensity of each reflected light beam is measured. This method is described more specifically. The surface reflectivity of the object 2 varies depending on the wavelength of the light beam to which the object is illuminated, in general. Assuming that the surface reflectivity when light having a wavelength $\lambda$ is cast onto the object 2 is Rf ($\lambda$), when the light sources 6 and 8 emit the light beams having wavelengths of $\lambda_1$ and $\lambda_2$, respectively, the reflected-light intensity $W_1$ of the light beam of the light source 6 is given as follows.

$$W_1 = Rf(\lambda_1) \cdot I_1/(4\pi R_1^2)$$

On the other hand, the reflected-light intensity $W_2$ of the light source 8 is as follows.

$$W_2 = Rf(\lambda_2) \cdot I_2/(4\pi R_2^2)$$

Because of the difference of the surface reflectivity between the wavelengths, the factor of the surface reflectivity Rf is not canceled even if the reflected-light intensity ratio $W_R$ is obtained. Thus, the information regarding the depth-direction distance to the subject cannot be obtained. If the difference between the wavelengths $\lambda_1$ and $\lambda_2$ is made very smaller and the difference between the surface reflectivities $Rf(\lambda_1)$ and $Rf(\lambda_2)$ is ignored, it is possible to obtain the reflected-light intensity ratio WR and to calculate the depth-direction distance to the subject. However, the calculation result may include an error in this case. In order to reduce the calculation error caused by the difference between the surface reflectivities $RF(\lambda_1)$ and $RF(\lambda_2)$, the difference between the wavelengths $\lambda_1$ and $\lambda_2$ has to be made sufficiently small. However, when the difference between the wavelengths $\lambda_1$ and $\lambda_2$ is made small, the precision in the wavelength separation is also reduced, so that the intensity measurement for the respective wavelengths may include an error. Therefore, the design of the apparatus is in dilemma as to whether to make the difference between the wavelengths $\lambda_1$ and $\lambda_2$ larger in order to increase the resolution of the wavelength separation thereby improving the precision of the intensity measurement or to make the difference between the wavelengths $\lambda_1$ and $\lambda_2$ smaller in order to make the difference between the surface reflectivities $Rf(\lambda_1)$ and $Rf(\lambda_2)$ smaller thereby improving the distance measurement. Thus, there is a limitation in improvement of the precision of the distance measurement.

Therefore, in the present embodiment, the depth-direction distance can be obtained in the following manner. A light beam having the first wavelength characteristics and a light beam having the second wavelength characteristics different from the first wavelength characteristics are cast onto the subject from optically different emission positions simultaneously. The light beams respectively having the first and second wavelength characteristics that are reflected from the subject are optically separated. Then, a dummy reflected-light intensity that is expected to be obtained from the subject in a case of assuming that a light beam having the first wavelength characteristics is cast from the emission position of the light beam having the second wavelength characteristics is calculated by using the reflected light beam having the second wavelength characteristics. Based on a ratio of the actual intensity of the reflected light beam having the first wavelength characteristics to the dummy reflected-light intensity, the depth-direction distance of the surface is calculated. In this method, the difference of the surface reflectivities between the wavelengths can be cancelled by obtaining the dummy reflected-light intensity. Accordingly, the depth of the subject can be precisely obtained.

Figure 2:
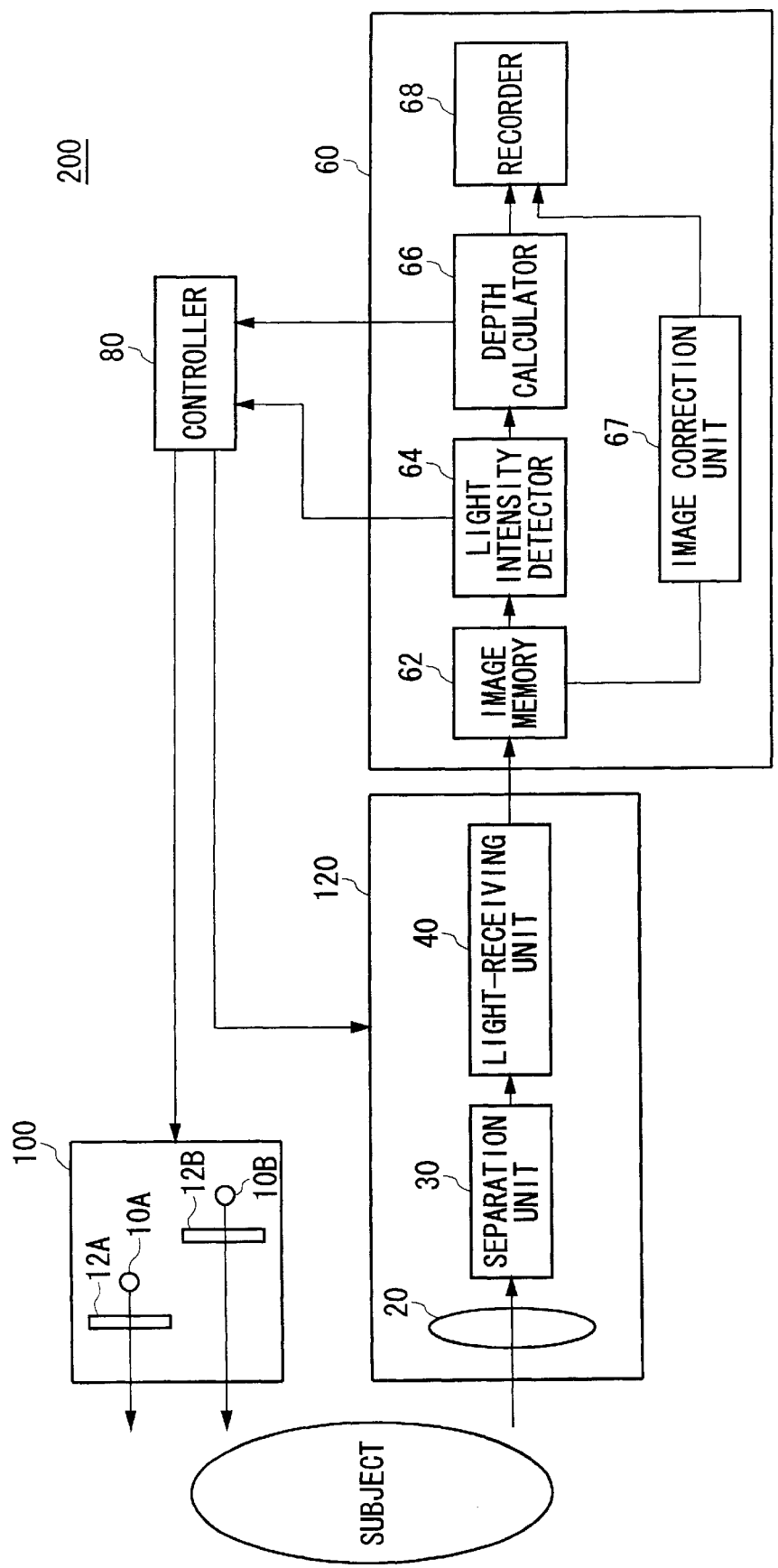
FIG. 2 is a diagram showing a structure of an image capturing apparatus 200 according to the first embodiment of the present invention.

FIG. 2 schematically shows a structure of an image capturing apparatus 200 according to the present embodiment. As an example of the image capturing apparatus 200, there are a digital still camera, a digital video camera that can capture a still image and the like. The image capturing apparatus 200 includes an illumination unit 100, a capturing unit 120, a processing unit 60 and a controller 80.

The illumination unit 100 casts light onto the subject. The capturing unit 120 captures an image of the subject that is illuminated with the light from the illumination unit 100. The processing unit 60 processes the image of the subject taken by the capturing unit 120 to obtain the depth-direction distance of the captured subject, so that the obtained depth-direction distance is recorded as information regarding a depth distribution of the subject. The processing unit 60 can also record the image of the subject taken by the capturing unit 120. The controller 80 perform a feedback control based on the depth-direction distance of the subject obtained by the processing unit 60 so as to control at least one of the intensity, an emission time, an emission time period and an emission position of the light emitted from the illumination unit 100, an exposure period of the capturing unit 120 and the like.

The illumination unit 100 includes light sources 10A and 10B and optical filters 12A and 12B. The light sources 10A and 10B are arranged at different positions. Light beams emitted from the light sources 10A and 10B pass through the optical filters 12A, 12B that allow light beams having predetermined wavelengths to pass therethrough, respectively, and then are cast onto the subject. In order to efficiently use the light amount or to optically increase the difference of the emission positions of the light sources 10A and 10B, the illumination unit 100 may include an optical lens, such as a condenser lens, inserted on optical paths of the illumination light beams to converge the light beams or to change the optical emission positions of the illumination light beams by a lens effect.

The capturing unit 120 includes an optical lens 20 as an optical converging unit, a separation unit 30 and a light-receiving unit 40. The optical lens 20 converges the reflected light from the subject as outgoing light from the subject. The separation unit 30 separates the reflected light from the subject into wavelength components in accordance with the wavelength characteristics of the light beams emitted from the illumination unit 100. The light-receiving unit 40 receives the reflected light beams after being converged by the optical lens 20 and have been subjected to the wavelength-separation by the separation unit 30.

The light-receiving unit 40 is a solid state image sensor, for example. The image of the subject is converged on a light-receiving surface of the solid state image sensor. In accordance with the light amount of the converged image of the subject, respective sensor elements of the solid state image sensor are electrically charged. The stored charges are scanned in a predetermined order, so that the charges are read as an electric signal.

It is desirable that the solid state image sensor be a charge-coupled device (CCD) image sensor having an excellent S/N ratio and a large number of pixels so as to allow the intensity of the reflected light from the subject to be detected with high precision for each pixel. As the solid state image sensor, any of an MOS image sensor, a Cd—Se contact image sensor, an a-Si (amorphous silicon) contact image sensor, and a bipolar contact image sensor may be used other than the CCD image sensor.

The processing unit 60 includes an image memory 62, a light intensity detector 64, a depth calculator 66, an image correction unit 67 and a recorder 68. The image memory 62 stores the image of the subject taken by the capturing unit 120 in accordance with the wavelength characteristics of the illumination light beam from the illumination unit 100. The light intensity detector 64 detects the intensity of the reflected light from the image of the subject stored in the image memory 62 for each pixel or pixel area. The depth calculator 66 calculates the depth-direction distance to a region of the subject that is captured in each pixel area based on the reflected-light intensity detected by the light intensity detector 64. The recorder 68 records the distribution of the depth-direction distance of the subject calculated by the depth calculator 66. The image correction unit 67 conducts correction such as gray-scale correction or correction of white balance for the image of the subject stored in the image memory 62. The recorder 68 records the image of the subject processed by the image correction unit 67.

Moreover, the light intensity detector 64 and the depth calculator 66 output the detected level of the reflected light from the subject and the information of the depth distribution of the subject to the controller 80, respectively. The recorder 68 records image data and the depth-distribution information onto a semiconductor memory such as a flash memory or a memory card.

The controller 80 conducts a feed-back control based on the depth-direction distance to the subject obtained by the processing unit 60 so as to control the intensity of the illumination light emitted by the illumination unit 100, the emission time, the emission position of the illumination unit 100, the sensitivity, an exposure time period or the like of the light-receiving unit 40 of the capturing unit 120. The controller 80 may control the illumination unit 100 and the capturing unit 120 by using luminance data from a luminance sensor (not shown) and/or distance data from a distance sensor (not shown). Also, the controller 80 may adjust a focal length, an aperture size, the exposure time period or the like based on the depth-direction distance to the subject obtained by the processing unit 60.

Figure 3:
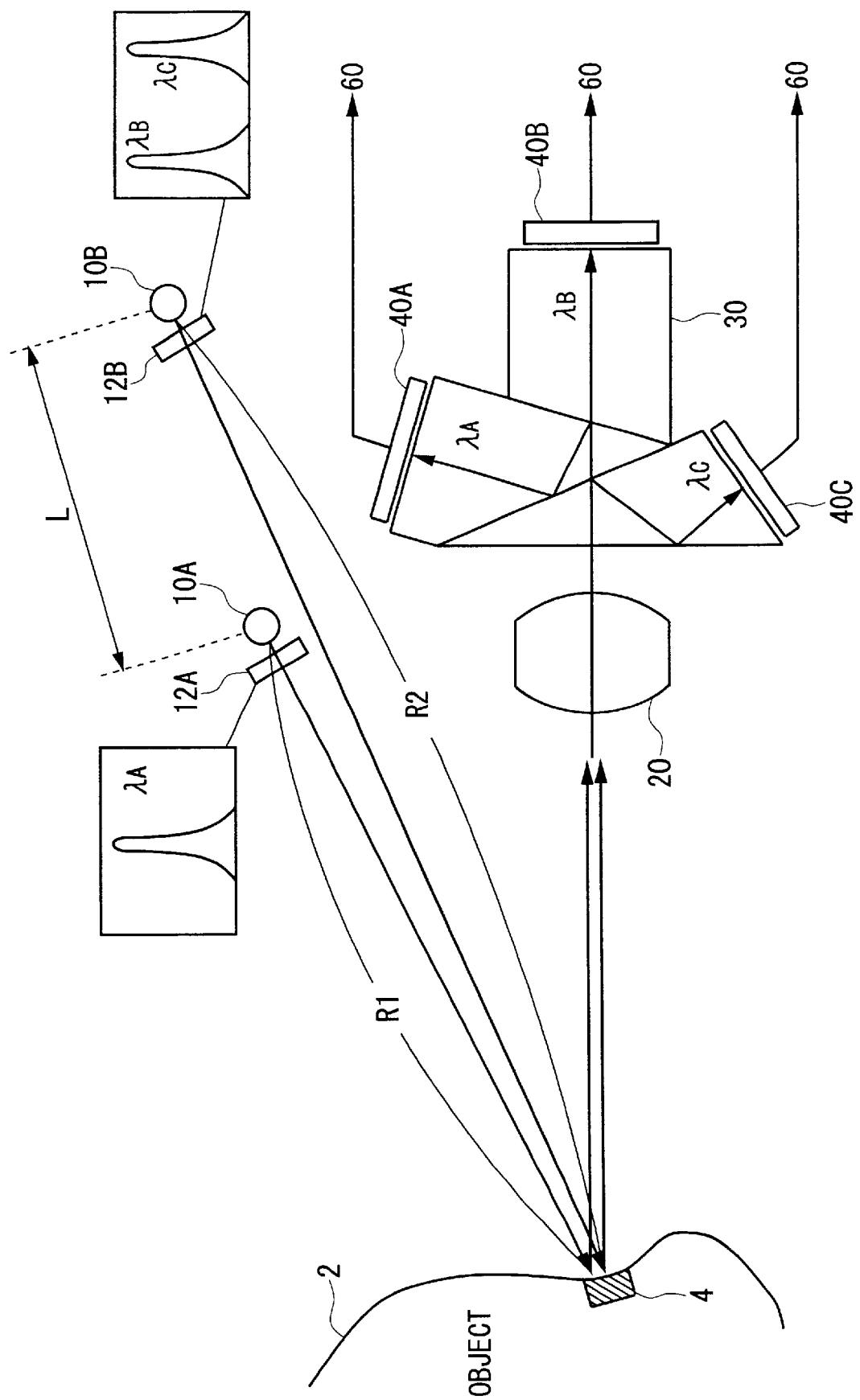
FIG. 3 shows an arrangement of an illumination unit 100 and a capturing unit 120 according to the first embodiment of the present invention.

FIG. 3 shows an arrangement of the illumination unit 100 and the capturing unit 120 in the present embodiment. The light sources 10A and 10B are arranged at positions apart from the object 2 by the distances R1 and R2, respectively. The space between the emission positions of the light sources 10A and 10B is L. The optical filter 12A mainly transmits light having a wavelength $\lambda_A$ while the optical filter 12B mainly transmits light having wavelengths $\lambda_B$ and $\lambda_C$. The illumination unit 100 casts the light having the wavelength $\lambda_A$ from the position of the light source 10A and the light having the wavelengths $\lambda_B$ and $\lambda_C$ from the position of the light source 10B onto the object 2 simultaneously.

The optical lens 20 of the capturing unit 120 converges the light reflected from the object 2. The separation unit 30 is a prism that separates the reflected light into three wavelength components $\lambda_A$, $\lambda_B$ and $\lambda_C$ to separate optical paths thereof. The light-receiving units 40A, 40B and 40C are three panels of solid state image sensors. The light beams having the wavelengths $\lambda_A$, $\lambda_B$ and $\lambda_C$ separated by the separation unit 30 are received by the light-receiving units 40A, 40B and 40C, respectively. The light beam received by each light-receiving unit is read as the electric charges by a photoelectric effect. The electric charges are converted into a digital electric signal by an A-D converter (not shown) to be input to the processing unit 60.

Figure 4:
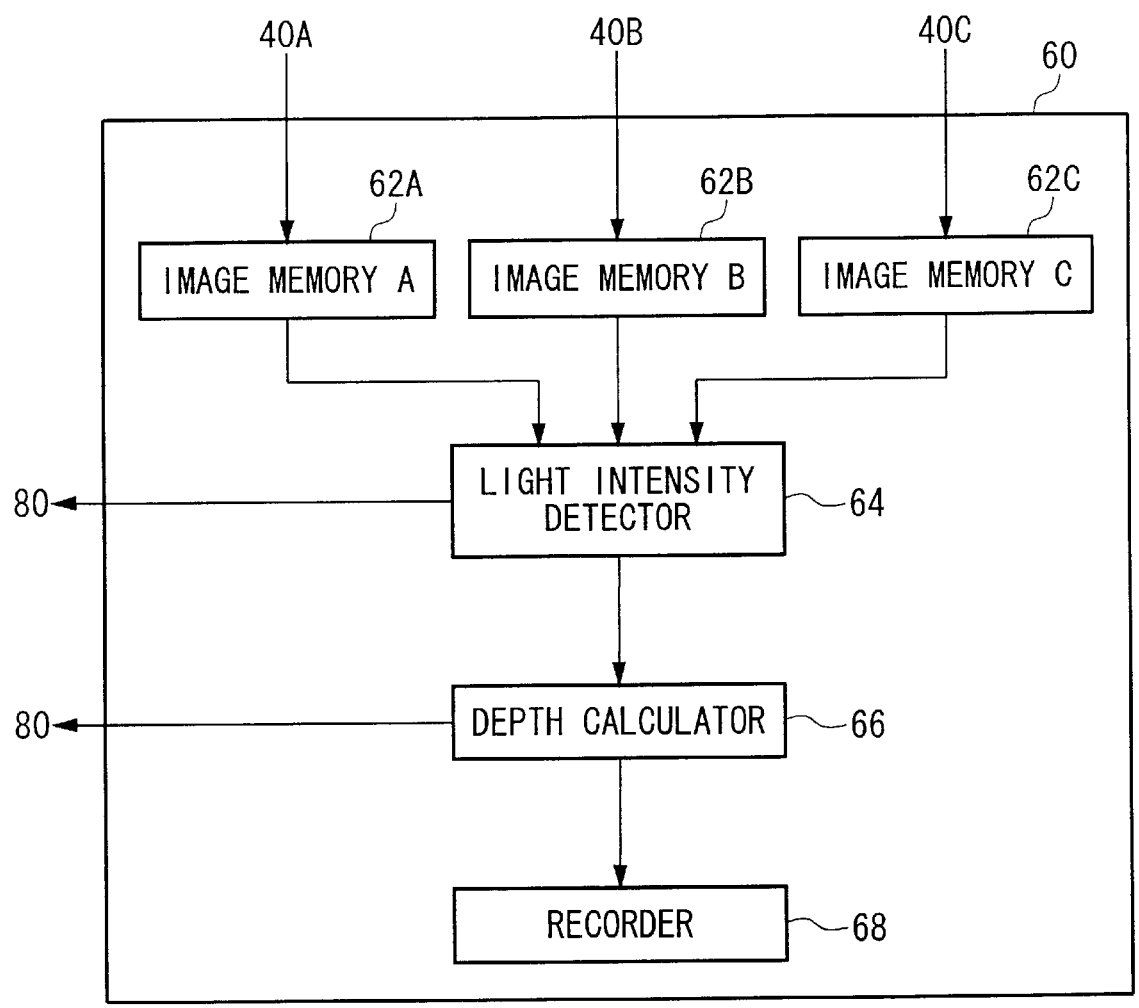
FIG. 4 shows a structure of a processing unit 60 according to the first embodiment of the present invention.

FIG. 4 shows the structure of the processing unit 60 in the present embodiment. The images of the subject output from the light-receiving units 40A, 40B and 40C are stored in image memories 62A, 62B and 62C, respectively. The light intensity detector 64 detects the reflected-light intensity for each of the wavelengths $\lambda_A$, $\lambda_B$ and $\lambda_C$ by using the image data stored in the respective image memories 62A, 62B and 62C. The depth calculator 66 obtains the distance from the light source 10A to the region 4 of the object 2 by using the reflected-light intensities for the wavelengths $\lambda$, $\lambda_B$ and $\lambda_C$ detected by the light intensity detector 64. The depth calculator 66 calculates, for each pixel or pixel area of the captured image, the depth-direction distance to the region of the subject captured in the pixel or the pixel area, thereby obtaining the depth distribution of the subject. The depth distribution thus obtained is output from the depth calculator 66 to be recorded by the recorder 68.

The light intensity detector 64 outputs the reflected-light intensities for the wavelengths $\lambda$, $\lambda_B$ and $\lambda_C$ to the controller 80. The depth calculator 66 outputs the depth-distribution information of the subject to the controller 80. The controller 80 adjusts the intensity of the light beam emitted from the light source 10A or 10B or adjusts the space between the emission positions of the light sources 10A and 10B, if the intensity level is not appropriate or the precision of the measurement of the depth-direction distance is not high. The controller 80 may select one of intensity ratios of the light beams emitted from the light sources 10A and 10B that are prepared in advance in accordance with the depth-direction distance of the subject. For example, the intensity ratio of the emitted light beams may be set to be a value close to one in a case where the subject is positioned closely or a larger value so as to increase the intensity of the emitted light beam from the light source 10B that is farther from the subject than the light source 10A in another case where the subject is distant from the light source.

Figure 5:
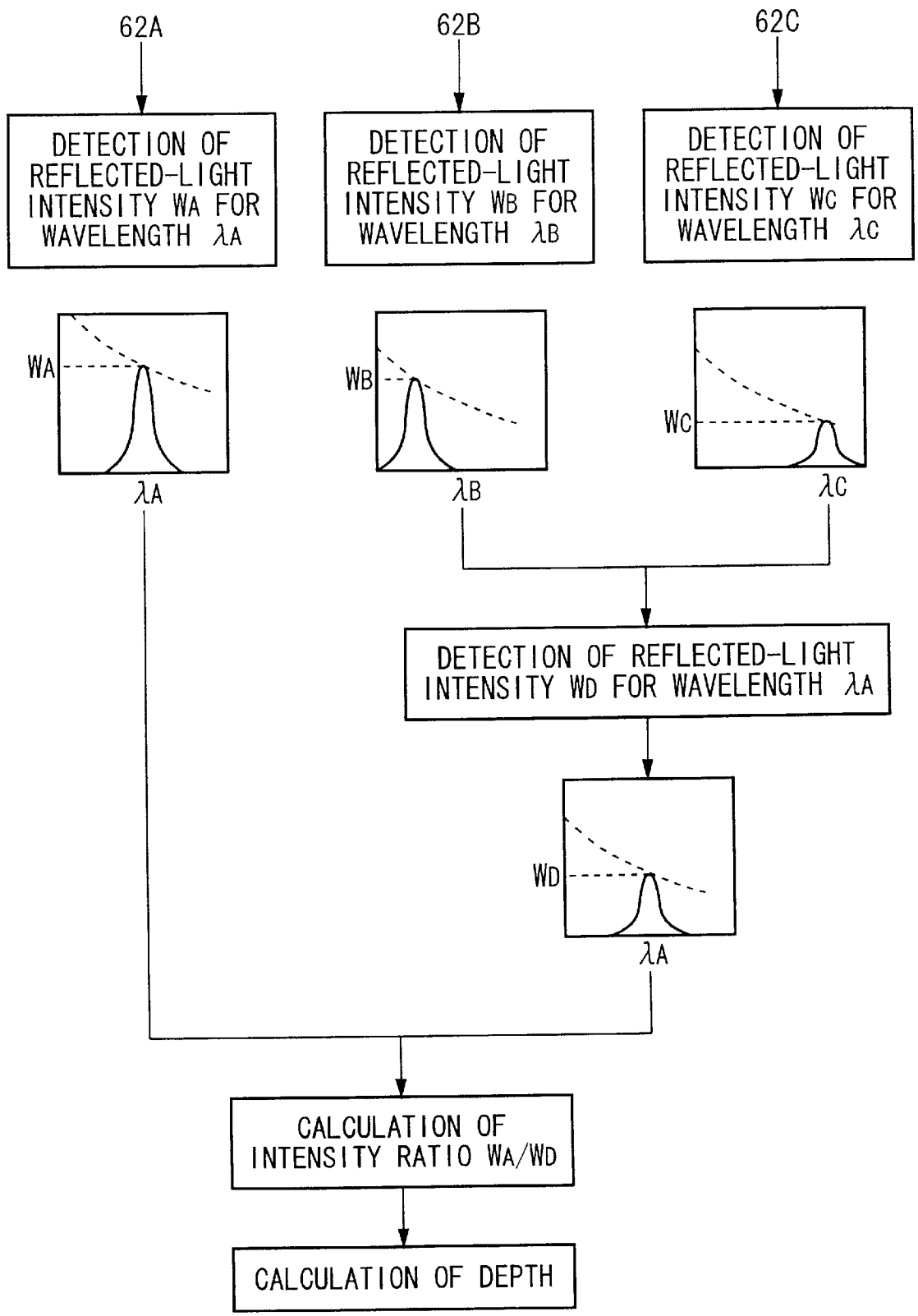
FIG. 5 is a diagram for explaining a depth-direction distance calculating method by a light intensity detector 64 and a depth calculator 66.

FIG. 5 is a diagram for explaining a method of calculating the depth-direction distance by the light intensity detector 64 and the depth calculator 66. The light intensity detector 64 detects the intensity $W_A$ of the reflected light having the wavelength $\lambda_A$, the intensity $W_B$ of the reflected light having the wavelength $\lambda_B$ and the intensity $W_C$ of the reflected light having the wavelength $\lambda_C$. Assuming that the intensities of the light beams emitted from the light sources 10A and 10B are $I_1$ and $I_2$ and the surface reflectivity of the object 2 for the wavelength $\lambda$ is $Rf(\lambda)$, the intensity $W_A$ of the reflected light having the wavelength $\lambda_A$ is expressed as follows.

$$W_A = Rf(\lambda_A) \cdot I_1 / (4\pi R_1^2)$$

Similarly, the intensity $W_B$ of the reflected light having the wavelength $\lambda_B$ and the intensity $W_C$ of the reflected light having the wavelength $\lambda_C$ are expressed as follows.

$$W_B = Rf(\lambda_B) \cdot I_2 / (4\pi R_2^2)$$

$$W_C = Rf(\lambda_C) \cdot I_2 / (4\pi R_2^2)$$

The depth calculator 66 obtains a dummy reflected-light intensity $W_D$ obtained from the subject in a case where it is assumed that the light having the wavelength $\lambda_A$ and the emission intensity $I_2$ is emitted from the emission position of the light source 10B, by using the intensity $W_B$ of the reflected light having the wavelength $\lambda_B$ and intensity $W_C$ of the reflected light having the wavelength $\lambda_C$. The dummy intensity $W_D$ is ideally as follows.

$$W_D = Rf(\lambda_A) \cdot I_2 / (4\pi R_2^2)$$

Thus, the factor of the surface reflectivity $Rf(\lambda_A)$ is cancelled by obtaining the ratio of the reflected-light intensity $W_A$ of the light having the wavelength $\lambda_A$ from the light source 10A to the dummy reflected-light intensity $W_D$ of the light having the same wavelength $\lambda_A$ from the light source 10B as follows.

$$W_A / W_D = (I_1 \cdot R_2^2) / (I_2 \cdot R_1^2)$$

From this expression and the relationship $R_2 - R_1 = L$, the depth-direction distance of the subject $R_1$ can be calculated.

Figure 6:
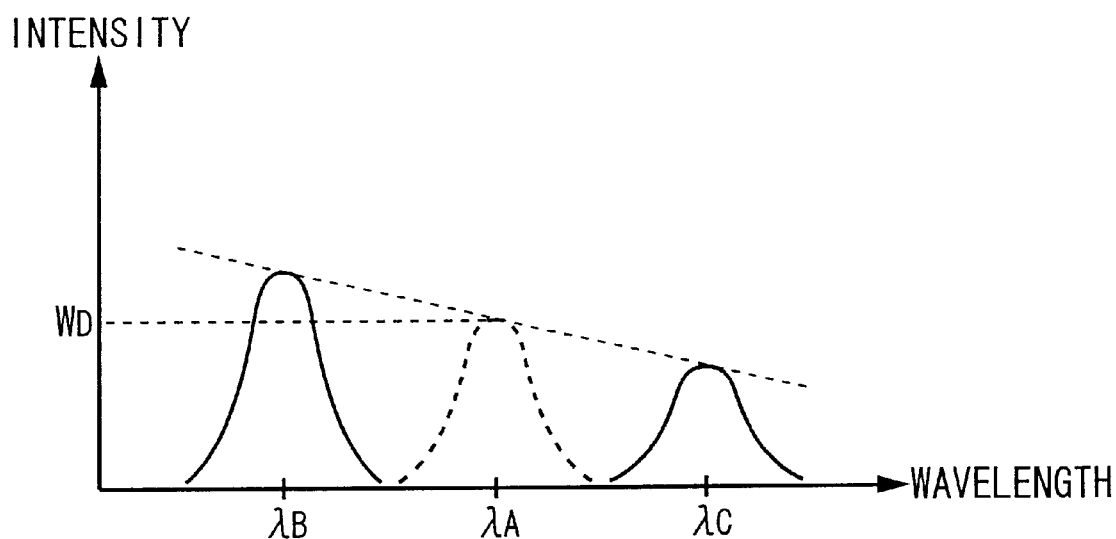
FIG. 6 is a diagram for explaining a method for obtaining a dummy reflected-light intensity by interpolation.

It should be noted that there are many modifications of the calculation method for obtaining the dummy reflected-light intensity $W_D$ by using the intensities $W_B$ and $W_C$ of the reflected light beams having the wavelengths $\lambda$ and $\lambda$. FIG. 6 is a diagram for explaining a method for obtaining the dummy reflected-light intensity by interpolation. In this method, the dummy reflected-light intensity $W_D$ for the wavelength $\lambda_A$ is obtained by interpolation of the reflected-light intensity $W_B$ for the wavelength $\lambda_B$ and the reflected-light intensity $W_C$ for the wavelength $\lambda_C$. The dummy reflected-light intensity $W_D$ may be obtained by linear interpolation. Alternatively, a mean value between the reflected-light intensity $W_B$ for the wavelength $\lambda_B$ and the reflected-light intensity $W_C$ for the wavelength $\lambda_C$ may be simply used as the dummy reflected-light intensity $W_D$.

Figure 7:
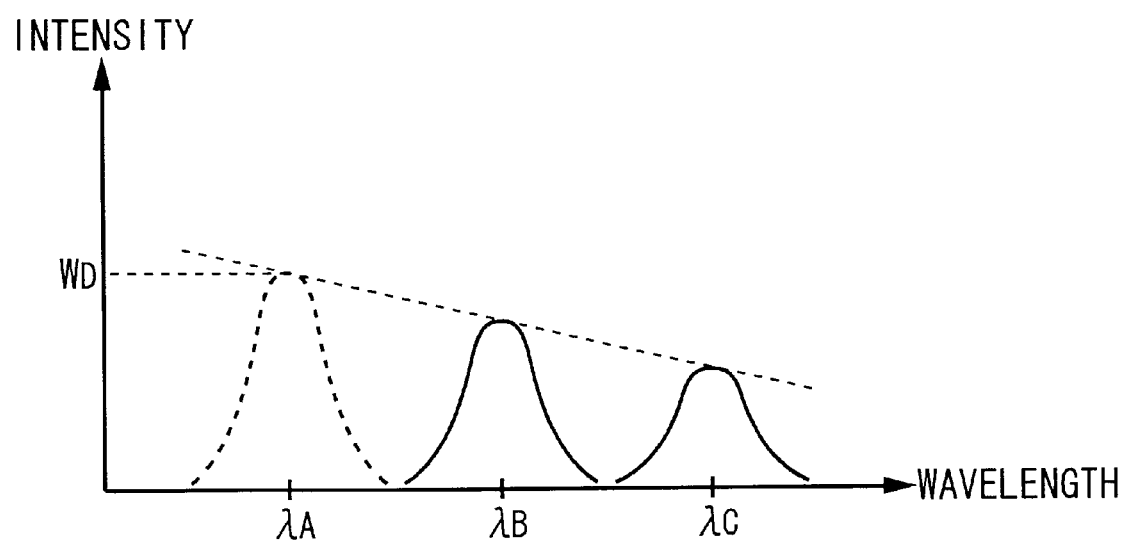
FIG. 7 is a diagram for explaining a method for obtaining the dummy reflected-light intensity by extrapolation.

FIG. 7 is a diagram for explaining a method for obtaining the dummy reflected-light intensity by extrapolation. In this method, the dummy reflected-light intensity $W_D$ for the wavelength $\lambda_A$ shorter than the wavelength $\lambda_B$ is obtained by extrapolation of the reflected-light intensity $W_B$ for the wavelength $\lambda_B$ and the reflected-light intensity $W_C$ for the wavelength $\lambda_C$.

Figure 8A:
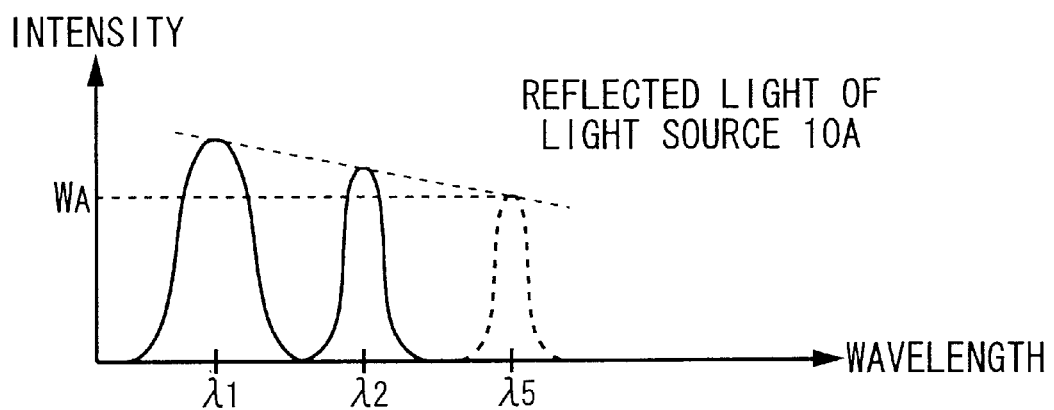
FIGS. 8A and 8B are diagrams for explaining a method for obtaining the dummy reflected-light intensity from the reflected light beams of light sources 10A and 10B.
Figure 8B:
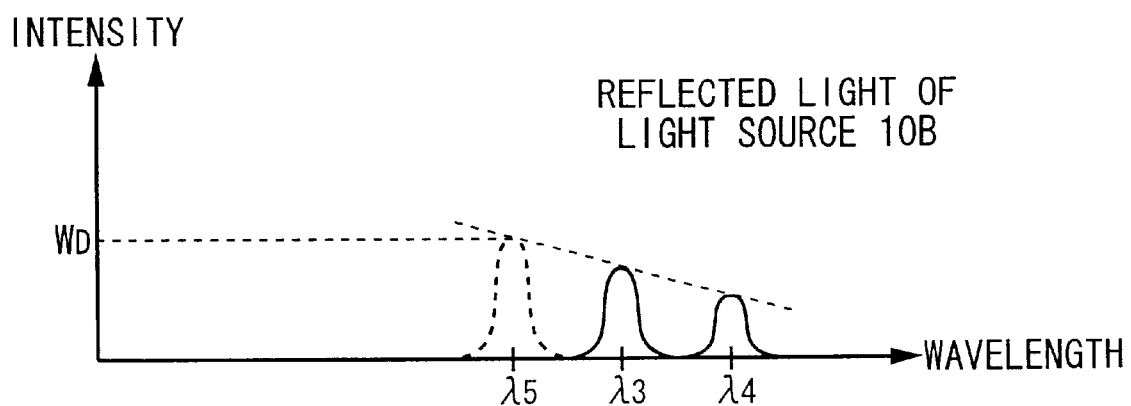

Another modification is described. FIGS. 8A and 8B are diagrams for explaining a method for obtaining the dummy reflected-light from the intensities of the reflected light beams of the light sources 10A and 10B. The illumination unit 100 casts illumination light having wavelengths $\lambda 1$ and $\lambda 2$ from the light source 10A and illumination light having wavelengths $\lambda 3$ and $\lambda 4$ from the light source 10B simultaneously. The capturing unit 120 separates reflected light from the subject into light having the wavelengths $\lambda 1$ and $\lambda 2$ and light having the wavelengths $\lambda$ and $\lambda$. The light intensity detector 64 obtains the intensity of the reflected light having the wavelengths $\lambda 1$ and $\lambda 2$. The depth calculator 66 calculates the reflected-light intensity $W_A$ in a case where it is assumed that light having a wavelength $\lambda 5$ with the same intensity as the intensity for the wavelengths $\lambda 1$ and $\lambda 2$ obtained by the light intensity detector 64 is emitted from the position of the light source 10A. Also, the light intensity detector 64 obtains the reflected-light intensity for the wavelengths $\lambda 3$ and $\lambda 4$ and the depth calculator 66 calculates the reflected-light intensity $W_D$ in a case where it is assumed that the light having the wavelength $\lambda 5$ with the same intensity as the intensity for the wavelengths $\lambda 3$ and $\lambda 4$ obtained by the light intensity detector 64 is emitted from the position of the light source 10B. The depth calculator 66 then obtains the ratio of the reflected-light intensity $W_A$ to $W_D$, thereby the depth-direction distance of the subject can be calculated.

A further modification is described referring to FIGS. 9A, 9B, 9C and 9D. FIGS. 9A, 9B, 9C and 9D are diagrams for explaining a method for obtaining the dummy reflected-light intensity in a case of using a band-pass filter that allows only long-wavelength light or short-wavelength light to pass therethrough. The optical filter 12A for the light source 10A is a band-pass filter that allows only light having a wavelength longer than the first boundary wavelength $\lambda_1$ to pass therethrough. The light emitted from the light source 10A passes through the optical filter 12A and is cast onto the subject as light having the wavelength characteristics shown in FIG. 9A. On the other hand, the optical filter 12B for the light source 10B is a band-pass filter that allows only light having a wavelength shorter than the second boundary wavelength $\lambda_2$ to pass therethrough. The light emitted from the light source 10B passes through the optical filter 12B and is cast onto the subject as light having the wavelength characteristics shown in FIG. 9B. The first boundary wavelength $\lambda_1$ may be shorter than the second boundary wavelength $\lambda_2$. In other words, the wavelength characteristics of the light beams allowed to pass through the optical filters 12A and 12B may be overlapped in a wavelength region from the first boundary wavelength $\lambda_1$ to the second boundary wavelengths $\lambda_2$. Thus, in a case where the first boundary wavelength $\lambda_1$ is shorter than the second boundary wavelength $\lambda_2$, the wavelength characteristics of the illumination light beams respectively emitted from the light sources 10A and 10B overlap each other in the wavelength region from the first boundary wavelength $\lambda_1$ to the second boundary wavelength $\lambda_2$.

Figure 9A:
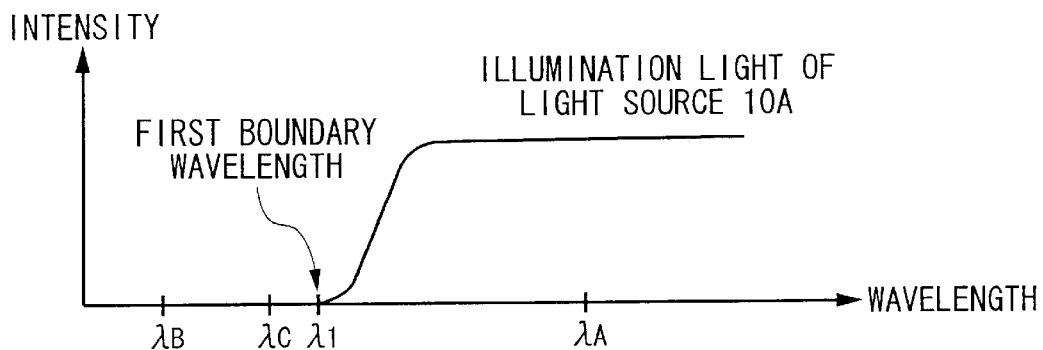
FIGS. 9A, 9B, 9C and 9D are diagrams for explaining a method for obtaining the dummy reflected-light intensity in a case of using a band-pass filter that only transmits long-wavelength light or short-wavelength light.
Figure 9B:
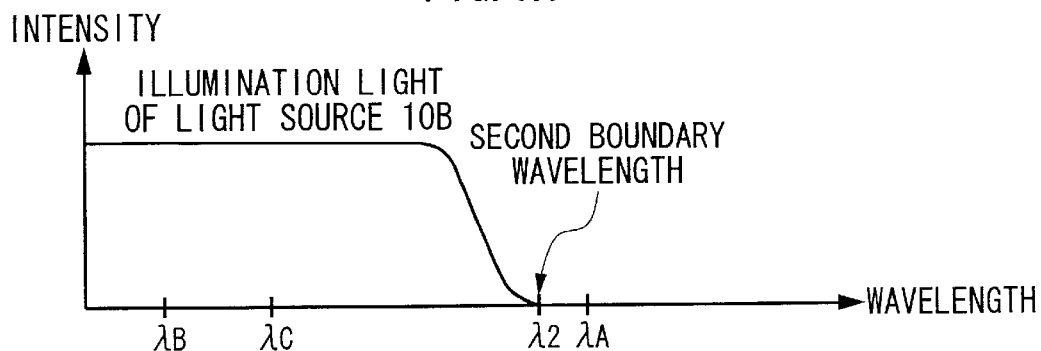
Figure 9C:
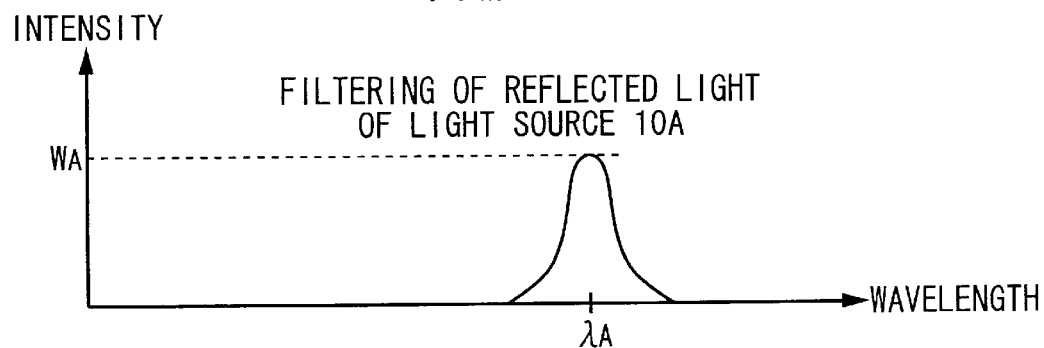
Figure 9D:
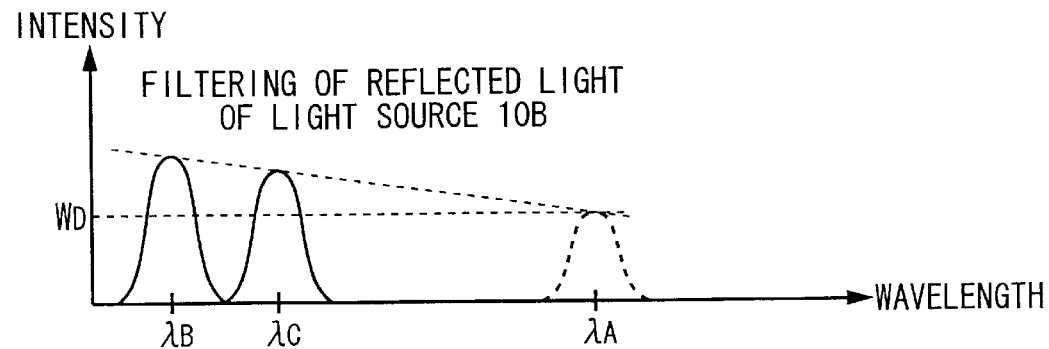

The separation unit 30 includes an optical filter that transmits the light having the wavelengths $\lambda_A$, $\lambda_B$ and $\lambda_C$, and separates the reflected light from the subject into light beams having the wavelengths $\lambda_A$, $\lambda_B$ and $\lambda_C$ so as to direct those light beams to the light-receiving unit 40. Although the reflected light beam of the light source 10A has the wavelength characteristics shown in FIG. 9A before passing through the separation unit 30, the optical filter of the separation unit 30 extracts the component having the wavelength $\lambda_A$ only as shown in FIG. 9C. Similarly, although the reflected light beam of the light source 10B has the wavelength characteristics shown in FIG. 9B before passing through the separation unit 30, the optical filter of the separation unit 30 extracts the components having the wavelengths $\lambda_B$ and $\lambda_C$ only as shown in FIG. 9D. Please note that the wavelength $\lambda_A$ has to be longer than a longer one of the first and second boundary wavelengths $\lambda_1$ and $\lambda_2$ while the wavelengths $\lambda_B$ and $\lambda_C$ have to be shorter than a shorter one of the first and second boundary wavelengths $\lambda_1$ and $\lambda_2$. This is because the reflected light having the wavelength $\lambda_A$ after being separated should not include interference with the illumination light beam from the light source 10B, while the reflected light having the wavelengths $\lambda_B$ and $\lambda_C$ should not include interference with the illumination light from the light source 10A. Then, the reflected-light intensity $W_A$ for the wavelength $\lambda_A$ is detected, and the dummy reflected-light intensity $W_D$ in a case where the reflected light having the wavelengths $\lambda_B$ and $\lambda_C$ is assumed to include the component having the wavelength $\lambda_A$ is obtained by extrapolation of the reflected-light intensities for the wavelengths $\lambda_B$ and $\lambda_C$. The process for obtaining the depth-direction distance of the subject from the reflected-light intensity ratio $W_A/W_D$ is the same as that described before.

Figure 10:
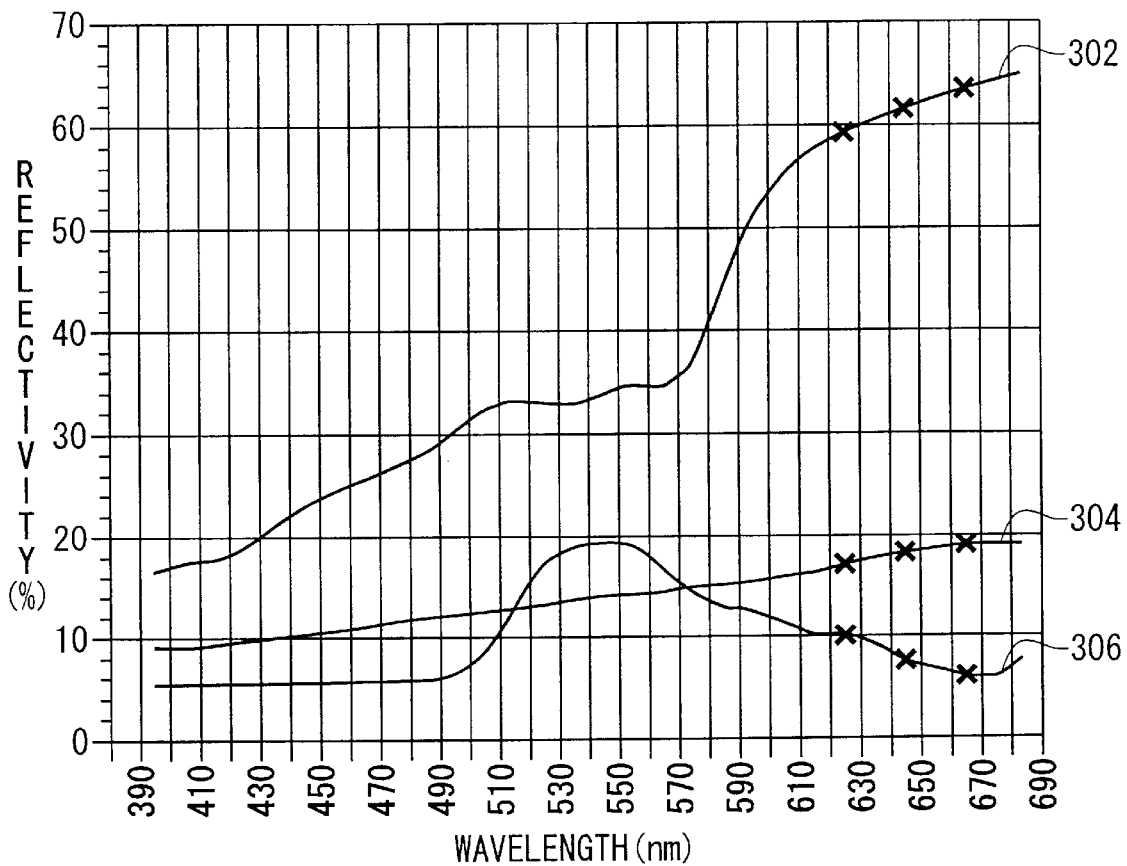
FIG. 10 is a graph showing the surface reflectivities of three kinds of objects.

It is preferable in any of the above-mentioned methods that the wavelengths $\lambda_B$ and $\lambda_C$ are set to values closer to each other so that it is possible to perform linear interpolation or linear extrapolation for the wavelengths $\lambda_B$ and $\lambda_C$, in order to obtain the dummy reflected-light intensity precisely by interpolation, extrapolation, averaging operation or the like. FIG. 10 shows the surface reflectivities of three kinds of objects. The horizontal axis represents the wavelength while the vertical axis represents the reflectivity. Graphs 302, 304 and 306 respectively show results of surface reflectivity measurements for the three kinds of objects, i.e., skin, a road and a leaf, by a spectrometer. Points corresponding to wavelengths of 630 nm, 650 nm and 670 nm are marked on the respective graphs. In wavelength regions of 630 nm, 650 nm and 670 nm, linear interpolation can be performed for any of the three kinds of objects. In addition, a light source having a wavelength in such regions is easily available. Thus, as the wavelengths $\lambda_A$, $\lambda_B$ and $\lambda_C$, wavelengths for which linear interpolation can be performed and which is easily available as the light source can be selected. Moreover, when image correction such as gray-scale correction, that is performed in a typical digital camera, is performed for the output signal from the solid state image sensor of the light-receiving unit 40, the linearity of the signal is lost. Therefore, it is preferable that the intensity is detected at a phase where the signal intensity has the linearity for the intensity of the light incident on the solid state image sensor and thereafter an operation such as interpolation, extrapolation, an averaging operation or the like is performed. Alternatively, a table showing an inverse function of a signal-conversion function by the image correction such as the gray-scale correction may be prepared in advance. In this case, the signal output after being subjected to the image correction is converted into the signal intensity having the linearity for the intensity of the light incident on the solid state image sensor with reference to the inverse-function table. Then, the intensity detection is performed and interpolation, extrapolation, an averaging operation or the like is performed.

Figure 11:
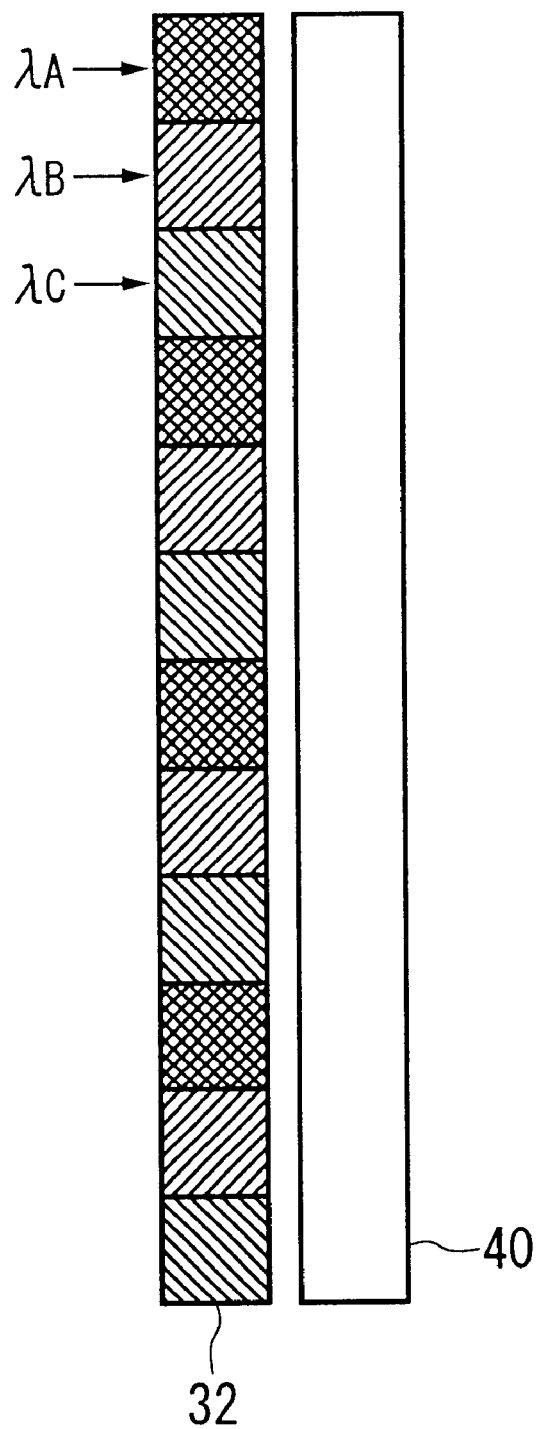
FIG. 11 shows an optical filter that transmits a predetermined wavelength light provided with a light-receiving unit 40.

In the above description, an optical device for splitting the optical path by separation of the light into wavelength components, such as a prism or a beam splitter, is used as the separation unit 30. However, an optical filter arranged on the light-receiving surface of the light-receiving unit 40 may be used as the separation unit 30. FIG. 11 is a diagram for explaining an optical filter that only transmits a specific wavelength component provided with the light-receiving unit 40. As the light-receiving unit 40, a single panel of solid state image sensor is used. On the light-receiving surface of the solid state image sensor is arranged the optical filter 32. The optical filter 32 includes filter portions that only transmit light beams having the wavelengths $\lambda_A$, $\lambda_B$ and $\lambda_C$, respectively, that are alternately arranged. Such an arrangement of the optical filter 32 makes it possible to find out which of the light beams having the wavelengths $\lambda_A$, $\lambda_B$ and $\lambda_C$ is received by a pixel of the solid state image sensor, thereby the light beams having the wavelengths $\lambda_A$, $\lambda_B$ and $\lambda_C$ can be received while being separated from each other. In this case, the size of the whole apparatus can be reduced as compared to a case of using the prism or the beam splitter, because the reflected light is received by the single panel of the solid state image sensor.

In the above description of the embodiment, in a case where the surface reflectivity of the subject largely depends on the wavelength of the illumination light, it is desirable that the wavelengths $\lambda_A$, $\lambda_B$ and $\lambda_C$ are set as close as possible in order to prevent occurrence of the error in the calculation of the dummy reflected-light intensity. On the other hand, in order to improve the precision of the detection of the reflected-light intensity for the respective wavelengths, it is desirable that inclusion of the components having a wavelength other than the wavelengths $\lambda_A$, $\lambda_B$ and $\lambda_C$ is made as little as possible or interference between the wavelengths is made as little as possible by setting the wavelengths $\lambda_A$, $\lambda_B$ and $\lambda_C$ to be values apart from each other so as to improve the resolution of the wavelengths $\lambda_A$, $\lambda_B$ and $\lambda_C$. Therefore, it is preferable to design the wavelength characteristics of the light sources 10A and 10B of the illumination unit 100, the wavelength-transmission characteristics of the optical filters 12A and 12B, and the wavelength-transmission characteristics of the separation unit 30 of the capturing unit 120 in accordance with the surface-reflectivity characteristics of the subject and/or the required measurement precision.

Figure 12:
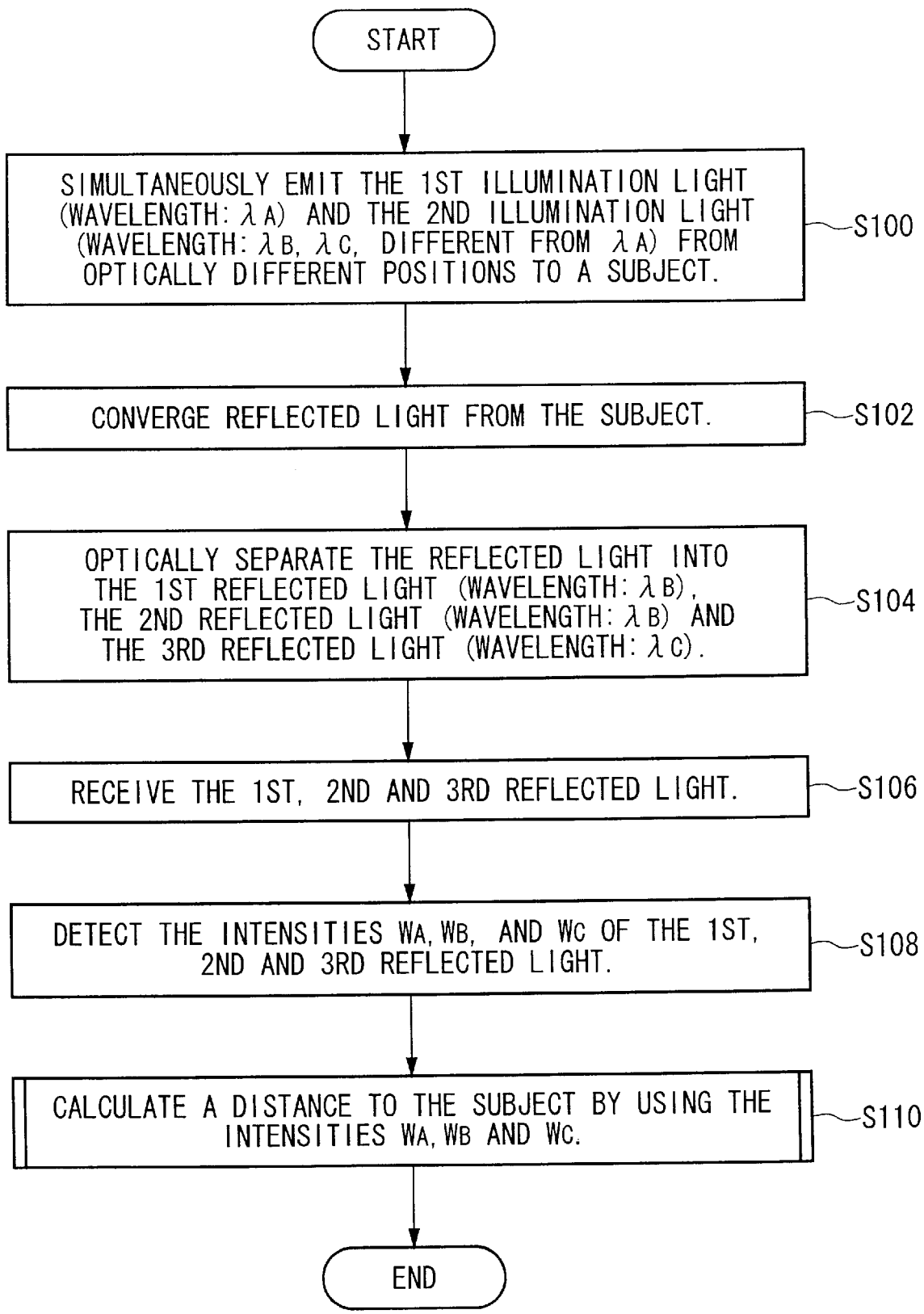
FIG. 12 is a flowchart of a distance measuring method according to the first embodiment of the present invention.

FIG. 12 is a flowchart of the distance measuring method according to the present embodiment. The illumination unit 100 casts the first illumination light mainly having the wavelength $\lambda_A$ and the second illumination light mainly having the wavelengths $\lambda_B$ and $\lambda_C$ that are different from the wavelength $\lambda_A$ from the optically different emission positions onto the subject simultaneously (S100).

The optical lens 20 of the capturing unit 120 converges the reflected light from the subject that is illuminated with the first and second illumination light (S102). The separation unit 30 separates the reflected light from the subject into the first reflected light beam having the wavelength $\lambda_A$, the second reflected light beam having the wavelength $\lambda_B$ and the third reflected light beam having the wavelength $\lambda_C$ (S104).

The light-receiving unit 40 receives the first, second and third reflected light beams (S106). The light intensity detector 64 of the processing unit 60 detects the intensities $W_A$, $W_B$ and $W_C$ of the first, second and third reflected light beams (S108).

The depth calculator 66 calculates the depth-direction distance to the subject by using the intensities $W_A$, $W_B$ and $W_C$ of the first, second and third reflected light beams (S110).

Figure 13:
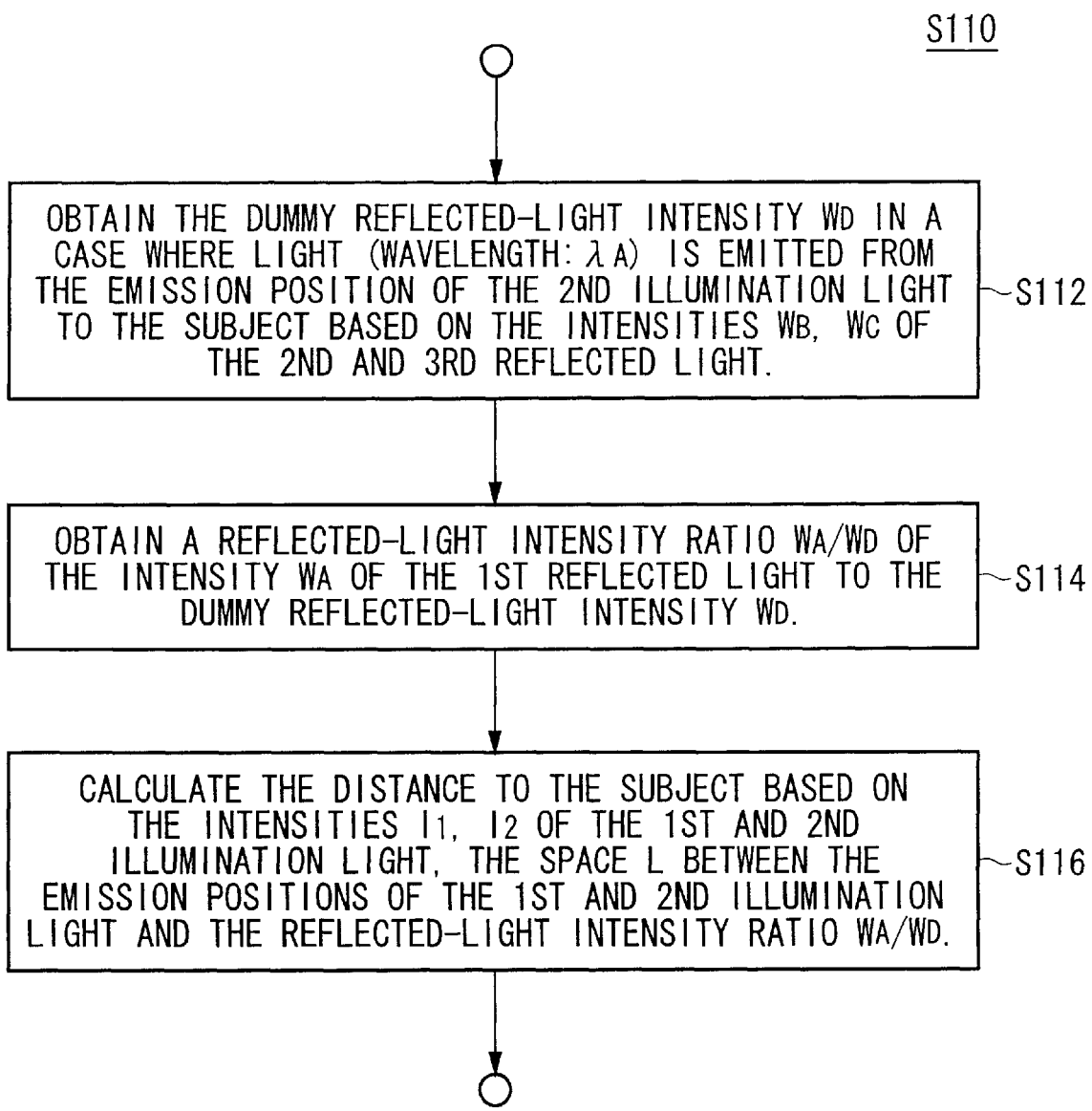
FIG. 13 is a flowchart of a depth calculation process S110.

FIG. 13 is a flowchart of the calculation process of the depth-direction distance S110. First, the dummy reflected-light intensity $W_D$ in a case where it is assumed that the light having the wavelength $\lambda_A$ and the intensity $I_2$ is emitted from the emission position of the second illumination light is obtained based on the intensities $W_B$ and $W_C$ of the second and third reflected light beams (S112). The dummy reflected-light intensity $W_D$ is obtained by interpolation or extrapolation of the intensities $W_B$ and $W_C$ of the second and third reflected light beams. Then, the ratio $W_A/W_D$ of the intensity $W_A$ of the first reflected light beam to the dummy reflected-light intensity $W_D$ is obtained (S114). Based on the intensities $I_1$ and $I_2$ of the first and second illumination light beams, the space L between the emission positions of the first and second light beams and the reflected-light intensity ratio $W_A/W_D$, the distance to the subject is calculated (S116).

Figure 14:
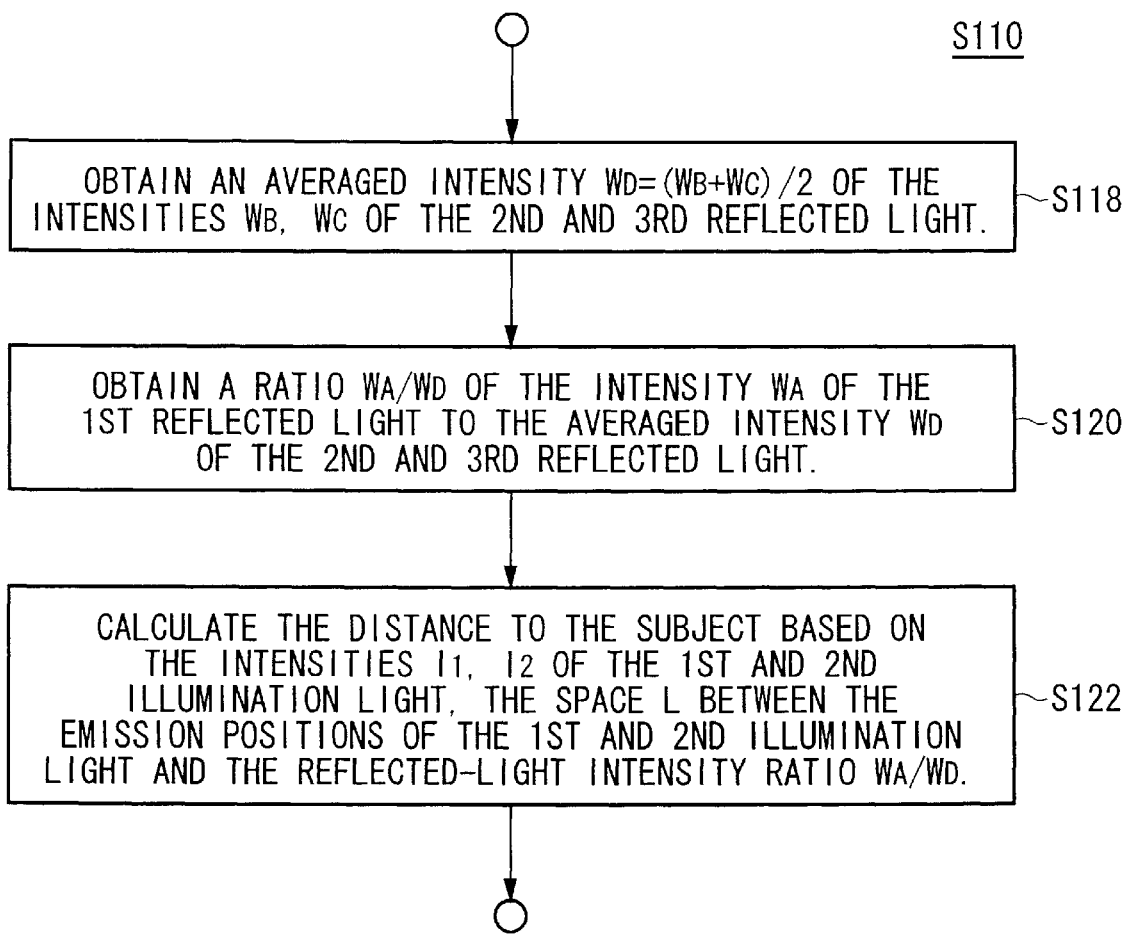
FIG. 14 is a flowchart of a modification of the depth calculation process S110.

FIG. 14 is a flowchart of a modification of the calculation process of the depth-direction distance S110. First, an average value $W_D=(W_B+W_C)/2$ of the intensities $W_B$ and $W_C$ of the second and third reflected light beams is obtained (S118). Then, the ratio $W_A/W_D$ of the intensity $W_A$ of the first reflected light beam to the averaged intensity $W_D$ of the second and third reflected light beams is obtained (S120). Based on the intensities $I_1$ and $I_2$ of the first and second illumination light beams, the space L of the emission positions of the first and second illumination light beams and the reflected-light intensity ratio $W_A/W_D$, the distance to the subject is calculated (S122).

As described above, according to the image capturing apparatus of the present embodiment, the illumination light beams having different wavelength characteristics are cast onto the subject from the optically different emission positions simultaneously. The light reflected from the subject is separated into wavelength components in accordance with the wavelength characteristics. Then, the depth-direction distance to the subject can be easily obtained by using the intensities of the reflected light beams separated from each other.

In addition, since the image of the subject carried by the reflected light beam is captured in the solid state image sensor and is then stored as image data, the depth-direction distance can be calculated by detecting the reflected-light intensity for each pixel or pixel area. Thus, the depth distribution of the region of the subject that is captured can be obtained. Accordingly, the depth distribution of the subject can be obtained from a two-dimensional image of the subject so as to create a three-dimensional image of the subject.

Embodiment 2

Figure 15:
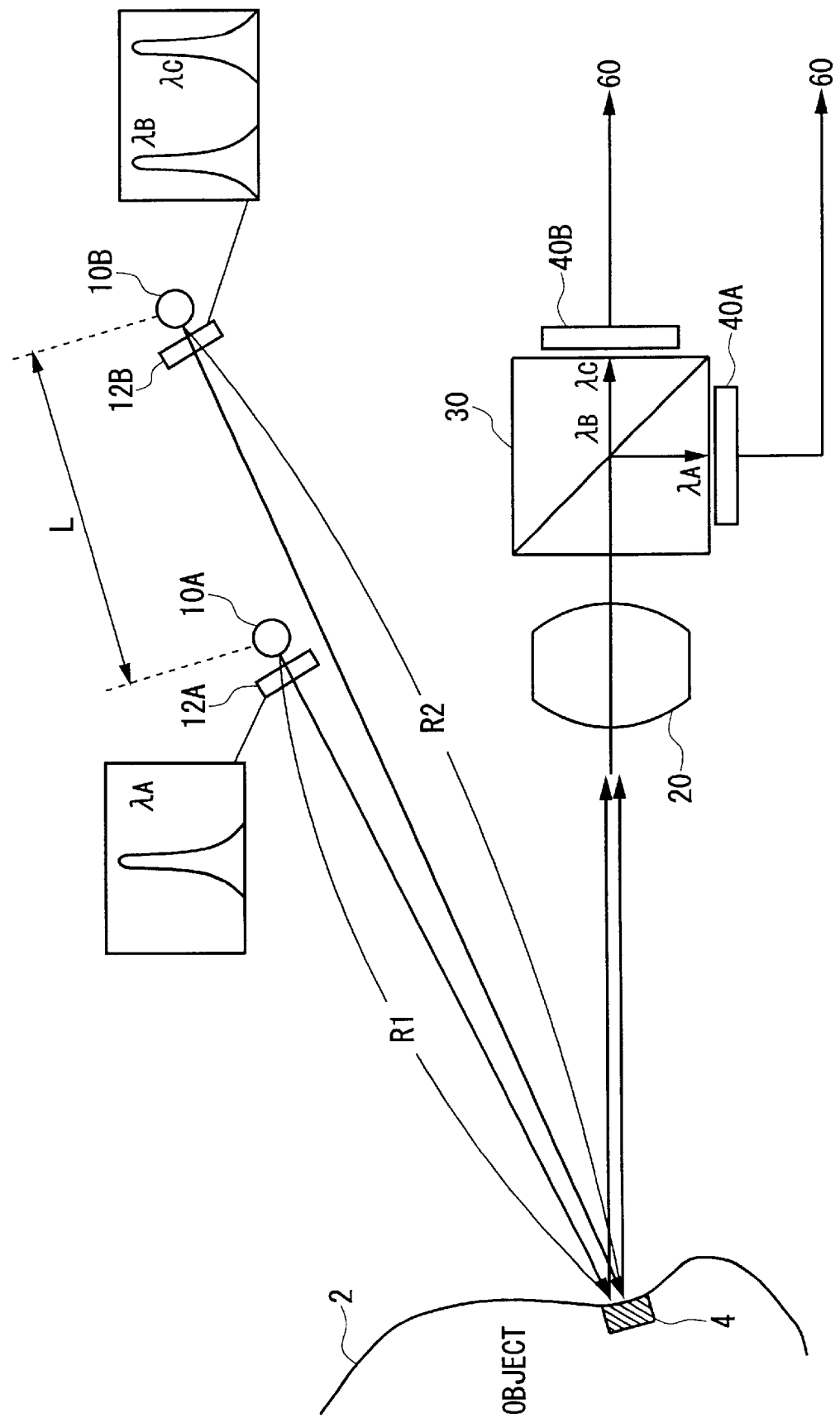
FIG. 15 is a diagram showing the arrangement of the illumination unit 100 and the capturing unit 120 according to the second embodiment of the present invention.

The second embodiment of the present invention is described. The image capturing device of the present embodiment is the same as that of the first embodiment except for the arrangement of the illumination unit 100 and the capturing unit 120, and therefore the description for the same components is omitted and only different components are described below. FIG. 15 is a diagram showing the arrangement of the illumination unit 100 and the capturing unit 120 in the present embodiment. In the present embodiment, the optical filter 12A of the illumination unit 100 mainly transmits light having a wavelength $\lambda_A$, while the optical filter 12B mainly transmits light having a wavelength $\lambda_B$ shorter than the wavelength $\lambda_A$ and light having a wavelength $\lambda_C$ longer than the wavelength $\lambda_A$. The illumination unit 100 casts the light having the wavelength $\lambda_A$ from the position of the light source 10A and the light having the wavelengths $\lambda_B$ and $\lambda_C$ from the position of the light source 10B onto the object 2 simultaneously.

The separation unit 30 of the capturing unit 120 is a prism for separating the light beam having the wavelength $\lambda_A$ from the light beam having the wavelengths $\lambda_B$ and $\lambda_C$ to split the optical path. The light-receiving units 40A and 40B are two panels of solid state image sensors. The light beam having the wavelength $\lambda_A$ separated by the separation unit 30 is received by the light-receiving unit 40A, while the light beam having the wavelengths $\lambda_B$ and $\lambda_C$ is received by the light-receiving unit 40B. The light beams received by the light-receiving units 40A and 40B are converted into electric signals to be input to the processing unit 60, respectively.

Figure 16:
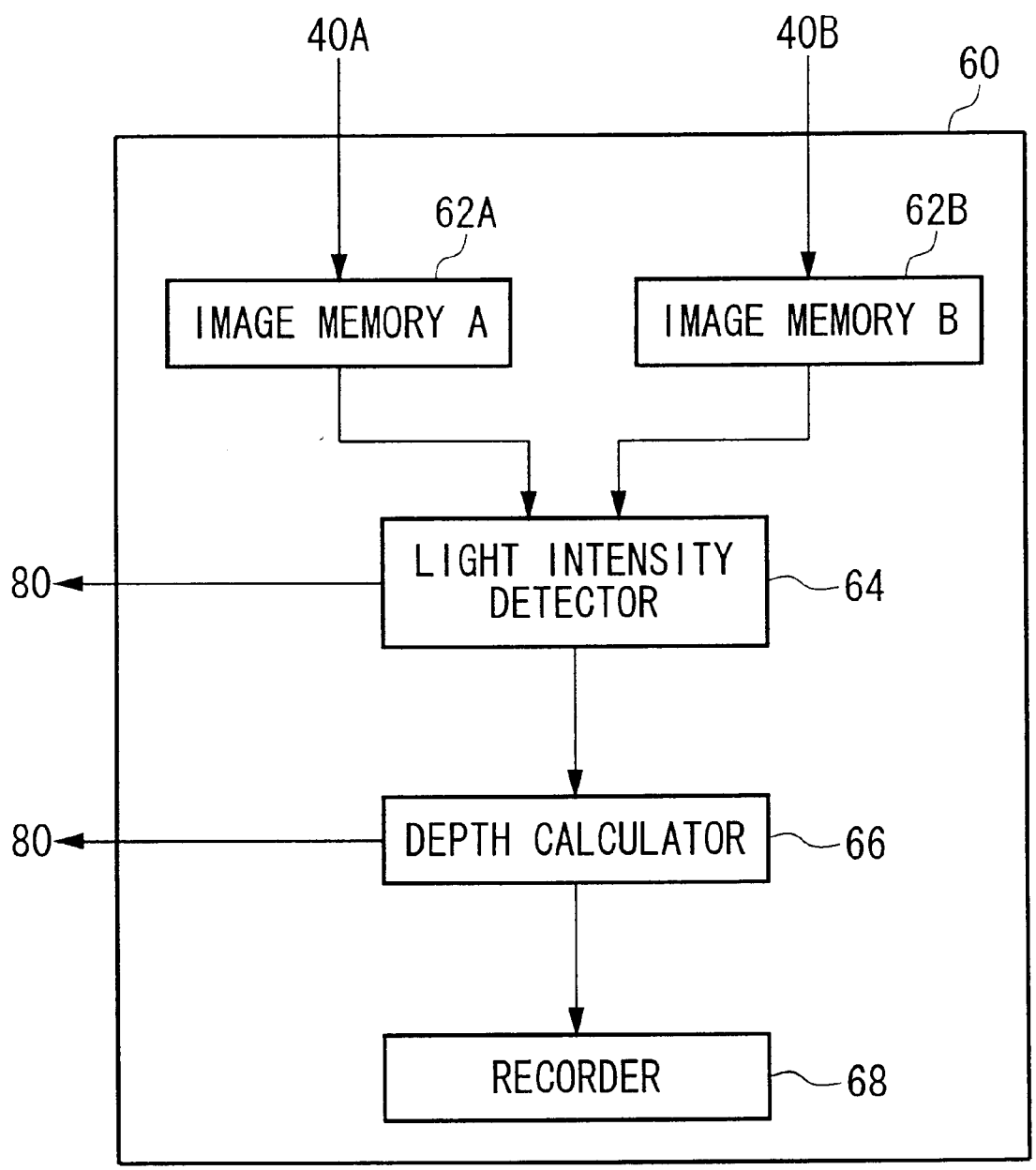
FIG. 16 is a diagram showing the structure of the processing unit 60 according to the second embodiment of the present invention.

FIG. 16 is a diagram showing the structure of the processing unit 60 in the present embodiment. The images of the subject output from the light-receiving units 40A and 40B are stored in the image memories 62A and 62B, respectively. The light intensity detector 64 detects the intensity of the reflected light having the wavelength $\lambda_A$ and the intensity of the reflected light having the wavelengths $\lambda_B$ and $\lambda_C$ by using the image data stored in the respective image memories 62A and 62B. The depth calculator 66 obtains the distance R1 to the region 4 of the object 2 from the light source 10A by using the intensity of the reflected light having the wavelength $\lambda_A$ and the intensity of the reflected light having the wavelengths $\lambda_B$ and $\lambda_C$ detected by the light intensity detector 64. The depth calculator 66 calculates, for each pixel or pixel area, the depth-direction distance to the region of the subject taken in the pixel or the pixel area so as to obtain the depth distribution of the subject. The obtained depth-distribution information is output to the recorder 68. The recorder 68 records the depth-distribution information.

Figure 17:
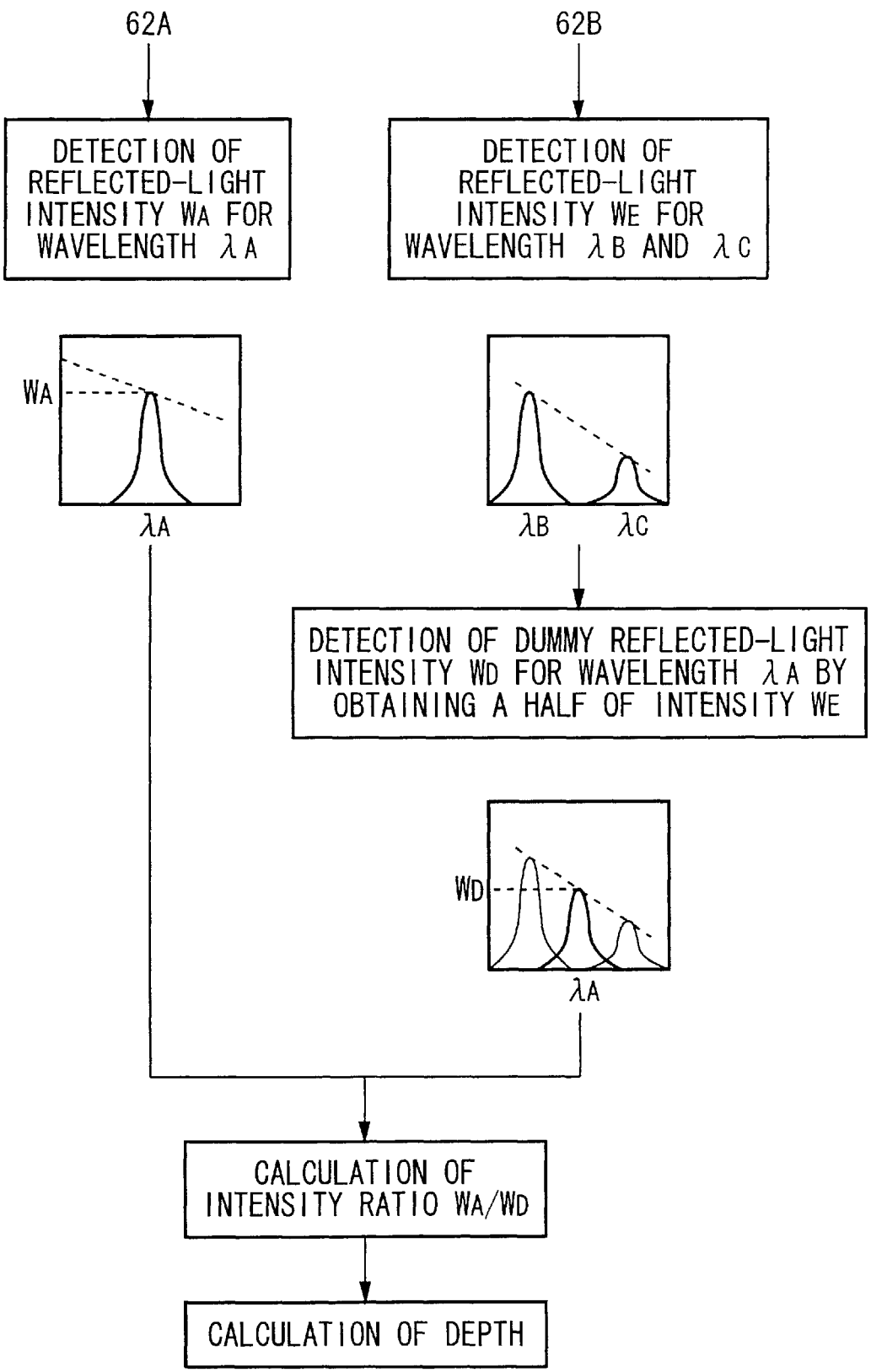
FIG. 17 is a diagram for explaining the depth-direction distance calculating method by the light intensity detector 64 and the depth calculator 66.

FIG. 17 is a diagram for explaining the depth-direction distance calculation method by the light intensity detector 64 and the depth calculator 66. The light intensity detector 64 detects the intensity $W_A$ of the reflected light having the wavelength $\lambda_A$ and the intensity $W_E$ of the reflected light having the wavelengths $\lambda_B$ and $\lambda_C$. Assuming that the intensities of the illumination light beams of the light sources 10A and 10B are $I_1$ and $I_2$ and the surface reflectivity of the object 2 for light having a wavelength $\lambda$ is Rf($\lambda$), the intensity $W_A$ of the reflected light having the wavelength $\lambda_A$ is expressed as follows.

$$W_A = Rf(\lambda_A) \cdot I_1 / (4\pi R_1^2)$$

On the other hand, the intensity $W_E$ of the reflected light having the wavelengths $\lambda_B$ and $\lambda$ is expressed as follows.

$$W_E = Rf(\lambda_B) \cdot I_2 / (4\pi R_2^2) + Rf(\lambda_C) \cdot I_2 / (4\pi R_2^2)$$

The depth calculator 66 sets $W_D$ to a half of the intensity $W_E$ of the reflected light having the wavelengths $\lambda_B$ and $\lambda_C$.

Since the wavelength $\lambda_A$ is a mean value of the wavelengths $\lambda_B$ and $\lambda_C$, the value of $W_D$ is approximately equal to the dummy reflected-light intensity obtained in a case where it is assumed that the light having the wavelength $\lambda_A$ and the emission intensity $I_2$ is emitted from the emission position of the light source 10B. The obtained value of $W_D$ is ideally as follows.

$$W_D = Rf(\lambda_A) \cdot I_2 / (4\pi R_2^2)$$

Thus, when the ratio of the reflected-light intensity $W_A$ of the light having the wavelength $\lambda_A$ from the light source 10A to the dummy reflected-light intensity $W_D$ of the light having the same wavelength $\lambda_A$ from the light source 10B is obtained, the factor of the surface reflectivity Rf($\lambda_A$) is cancelled, and $$W_A / W_D = (I_1 \cdot R_2^2) / (I_2 \cdot R_1^2)$$

is obtained. From this expression and the relationship $R_2 - R_1 = L$, the depth-direction distance $R_1$ to the subject can be calculated.

Figure 18A:
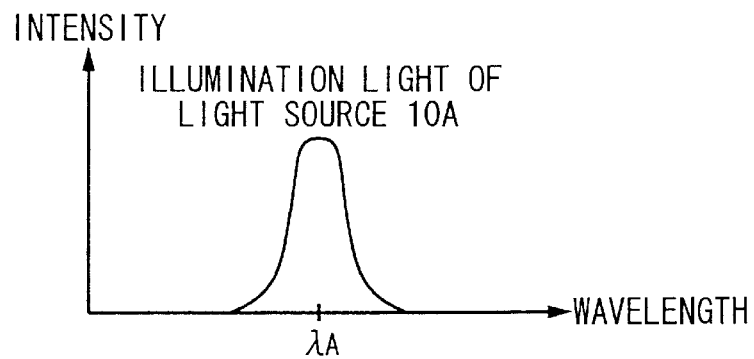
FIGS. 18A, 18B, 18C and 18D are diagrams for explaining a method for separating reflected light beams by a band-cut filter.
Figure 18B:
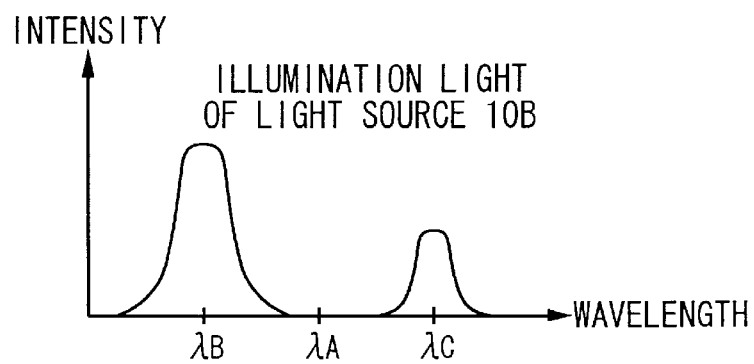
Figure 18C:
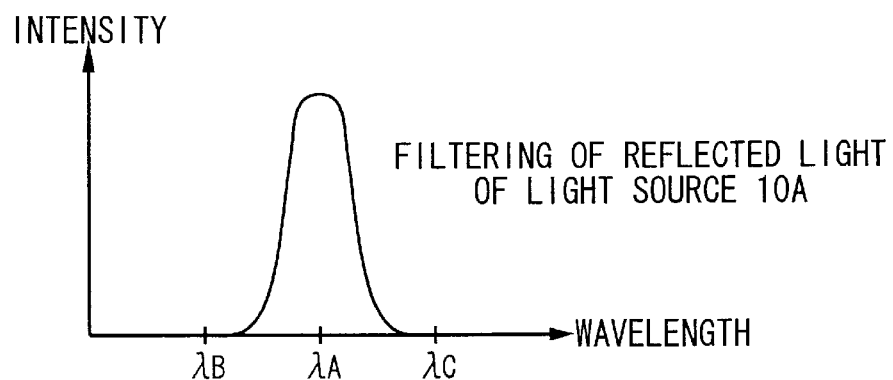
Figure 18D:
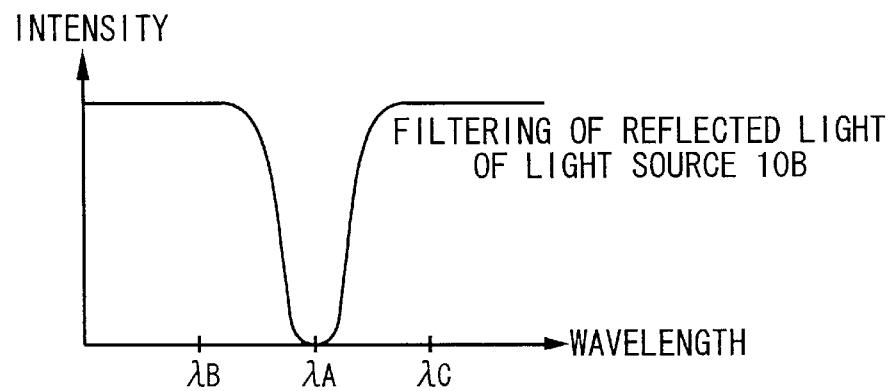

In order to obtain the dummy reflected-light intensity $W_D$ precisely, it is preferable that the wavelength $\lambda_A$ is the mean value of the wavelengths $\lambda_B$ and $\lambda_C$. In the above description, the separation unit 30 separates the light having the wavelength $\lambda_A$ from the light having the wavelengths $\lambda_B$ and $\lambda_C$. However, it is not necessary to selectively transmit the light having the wavelengths $\lambda_B$ and $\lambda_C$ for the purpose of filtering. The same effects as those described above can be obtained in a case of using a band-cut filter that cuts the light having the wavelength $\lambda_A$. FIGS. 18A, 18B, 18C and 18D are diagrams for explaining a method for separating the reflected light by using the band-cut filter. As shown in FIG. 18A, the illumination light from the light source 10A has the wavelength characteristics in which the wavelength $\lambda_A$ is a main component. On the other hand, the illumination light from the light source 10B has the wavelength characteristics in which the wavelengths $\lambda_B$ and $\lambda_C$ between which the wavelength $\lambda_A$ exists are main components, as shown in FIG. 18B. The separation unit 30 includes a band-pass filter that mainly transmits the light having the wavelength $\lambda_A$ as shown in FIG. 18C and a band-cut filter that mainly cuts the light having the wavelength $\lambda_A$ as shown in FIG. 18D. The separation unit 30 separates the reflected light having the wavelength $\lambda_A$ by making the reflected light from the subject pass through the band-pass filter, and also separates the reflected light having the wavelengths $\lambda_B$ and $\lambda_C$ by making the reflected light form the subject pass through the band-cut filter. The method for obtaining the depth of the subject based on the ratio of the half of the intensity of the reflected light having the wavelengths $\lambda_B$ and $\lambda_C$ and the intensity of the reflected light having the wavelength $\lambda_A$ is described above.

Figure 19:
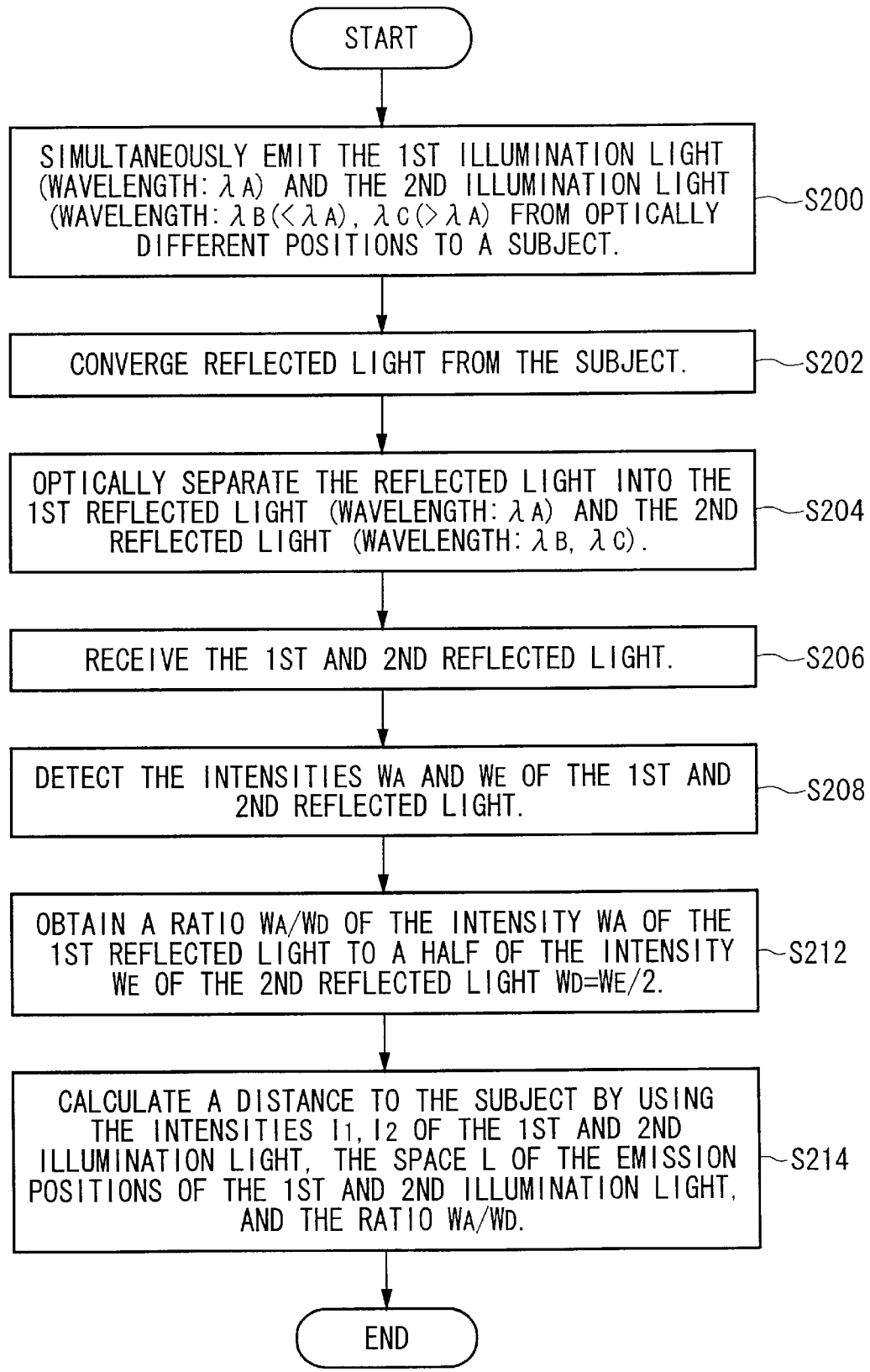
FIG. 19 is a flowchart of the distance measuring method according to the second embodiment of the present invention.

FIG. 19 is a flowchart of the distance measuring method of the present embodiment. The illumination unit 100 casts the first illumination light mainly having the wavelength $\lambda_A$ and the second illumination light mainly having both the wavelength $\lambda_B$ shorter than the wavelength $\lambda_A$ and the wavelength $\lambda_C$ longer than the wavelength $\lambda_A$ from the optically different emission positions onto the subject simultaneously (S200).

The optical lens 20 of the capturing unit 120 converges the reflected light from the subject that is illuminated with the first and second illumination light (S202). The separation unit 30 optically separates the reflected light from the subject into the first reflected light having the wavelength $\lambda_A$ and the second reflected light having the wavelengths $\lambda_B$ and $\lambda_C$ (S204).

The light-receiving unit 40 receives the separated first and second reflected light beams (S206). The light intensity detector 64 of the processing unit 60 detects the intensities $W_A$ and $W_E$ of the first and second reflected light beams (S208).

The depth calculator 66 obtains the ratio $W_A/W_D$ of the intensity $W_A$ of the first reflected light beam to a half $W_D$ of the intensity $W_E$ of the second reflected light beam (S212), and calculates the distance to the subject based on the intensities $I_1$ and $I_2$ of the first and second illumination light beams, the space L between the emission positions of the first and second light beams and the reflected-light intensity ratio $W_A/W_D$ (S214).

In the above description, an optical splitting device for separating light incident thereto into wavelength components to split the optical paths, such as a prism or a beam splitter, is used as the separation unit 30. However, instead of this, a single panel of solid state image sensor may be used as the light-receiving unit 40 while the optical filter 32 as the separation unit 30 is provided on the light-receiving surface of the solid state image sensor, as in Embodiment 1. The optical filter 32 includes filter portions transmitting only the wavelength $\lambda_A$ and filter portions transmitting only the wavelengths $\lambda_B$ and $\lambda_C$ that are alternately arranged. In this case, the size of the whole apparatus can be reduced because the light is received by the single panel of the solid state image sensor, as compared to the case of using the prism and the beam splitter.

As described above, according to the image capturing apparatus of the present invention, the first illumination light having the first wavelength as the main component and the second illumination light mainly having the second and third wavelengths between which the first wavelength exists as the mean wavelength thereof are cast onto the subject from the optically different emission position simultaneously. The reflected light from the subject is separated into the first reflected light having the first wavelength and the second reflected light having the second and third wavelengths. Based on the ratio of the intensity of the first reflected light and a half of the intensity of the second reflected light, the depth-direction distance to the subject can be calculated. Since the dummy reflected-light intensity in a case where the light having the first wavelength is emitted from the emission position of the second illumination light can be obtained only by obtaining a half of the intensity of the second reflected light, it is possible to calculate the depth-direction distance to the subject very easily. In addition, according to the present embodiment, since the number of the solid state image sensors for receiving the reflected light from the subject can be reduced to two, the size of the whole apparatus can be reduced.

Embodiment 3

Figure 20:
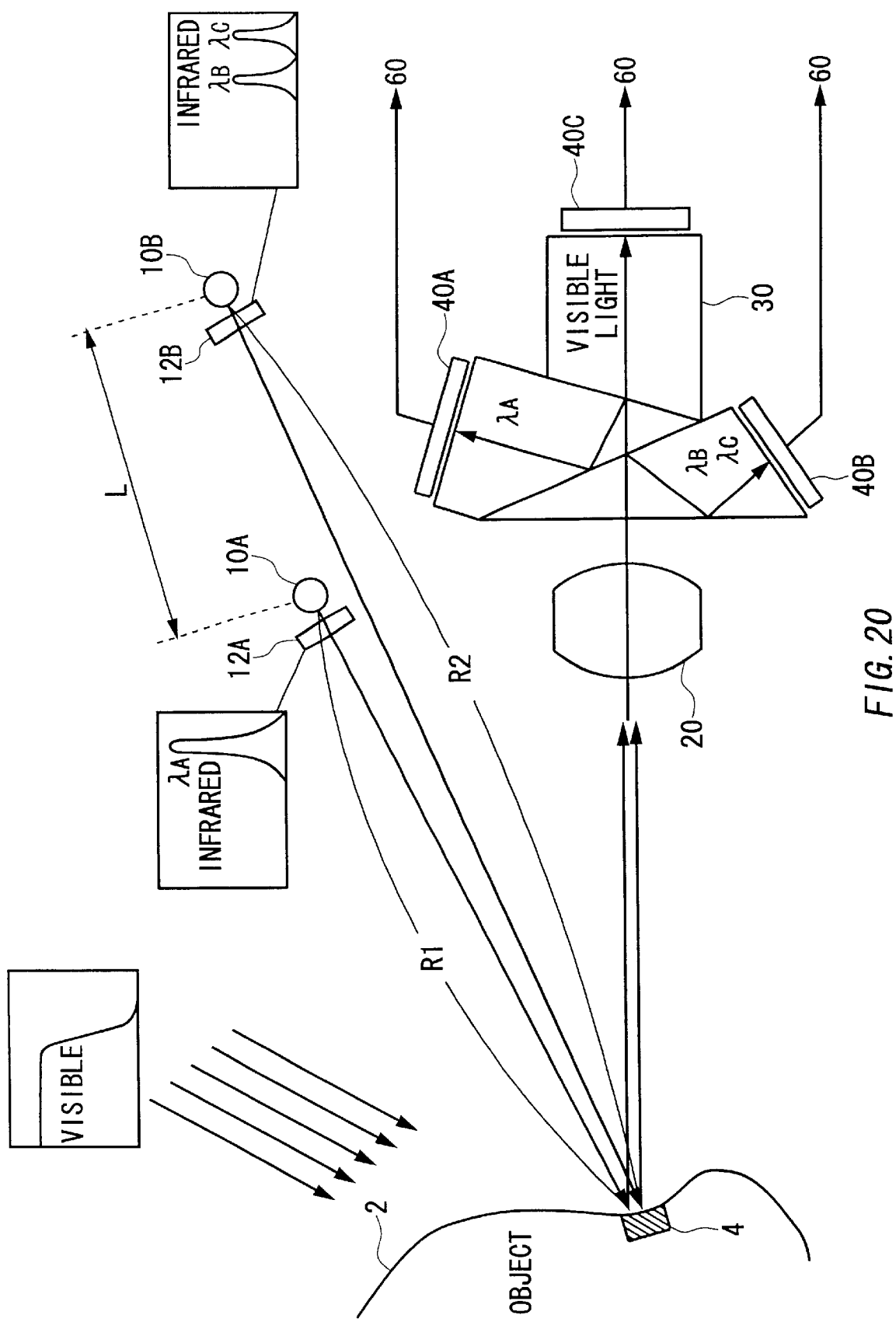
FIG. 20 is a diagram showing the arrangement of the illumination unit 100 and the capturing unit 120 according to the third embodiment of the present invention.

The third embodiment of the present invention is described. The image capturing apparatus of the present invention is the same as that of the first embodiment except for the arrangement of the illumination unit 100 and the capturing unit 120. Therefore, the description for the same components as those in the first embodiment is omitted but only different components are described below. FIG. 20 is a diagram showing the arrangement of the illumination unit 100 and the capturing unit 120 in the present embodiment. In the present embodiment, the light sources 10A and 10B are infrared light sources. The optical filter 12A transmits light having a wavelength $\lambda_A$ in an infrared region while the optical filter 12B transmits light having wavelengths $\lambda_B$ and $\lambda_C$ in the infrared region. The illumination unit 100 casts the light having the wavelength $\lambda_A$ in the infrared region from the position of the light source 10A and the light having the wavelengths $\lambda_B$ and $\lambda_C$ in the infrared region from the light source 10B onto the object 2 simultaneously. The object 2 is also illuminated with other light having wavelengths in a visible region, for example, natural light or light from lighting.

The separation unit 30 of the capturing unit 120 is a prism for separating the light having the wavelength $\lambda_A$ in the infrared region, the light having the wavelengths $\lambda_B$ and $\lambda_C$ in the infrared region and the light in the visible region so as to split optical paths thereof from each other. The light-receiving units 40A, 40B and 40C are three panels of solid state image sensors. The light having the wavelength $\lambda_A$, the light having the wavelengths $\lambda_B$ and $\lambda_C$, and the light in the visible region are received by the light-receiving units 40A, 40B and 40C, respectively. In order to prevent the captured images by the light in the infrared region from being out of focus, the light-receiving units 40A and 40B are adjusted in advance so as to form the images in focus. The light beams received by the light-receiving units 40A, 40B and 40C are converted into electric signals to be input to the processing unit 60, respectively.

Figure 21:
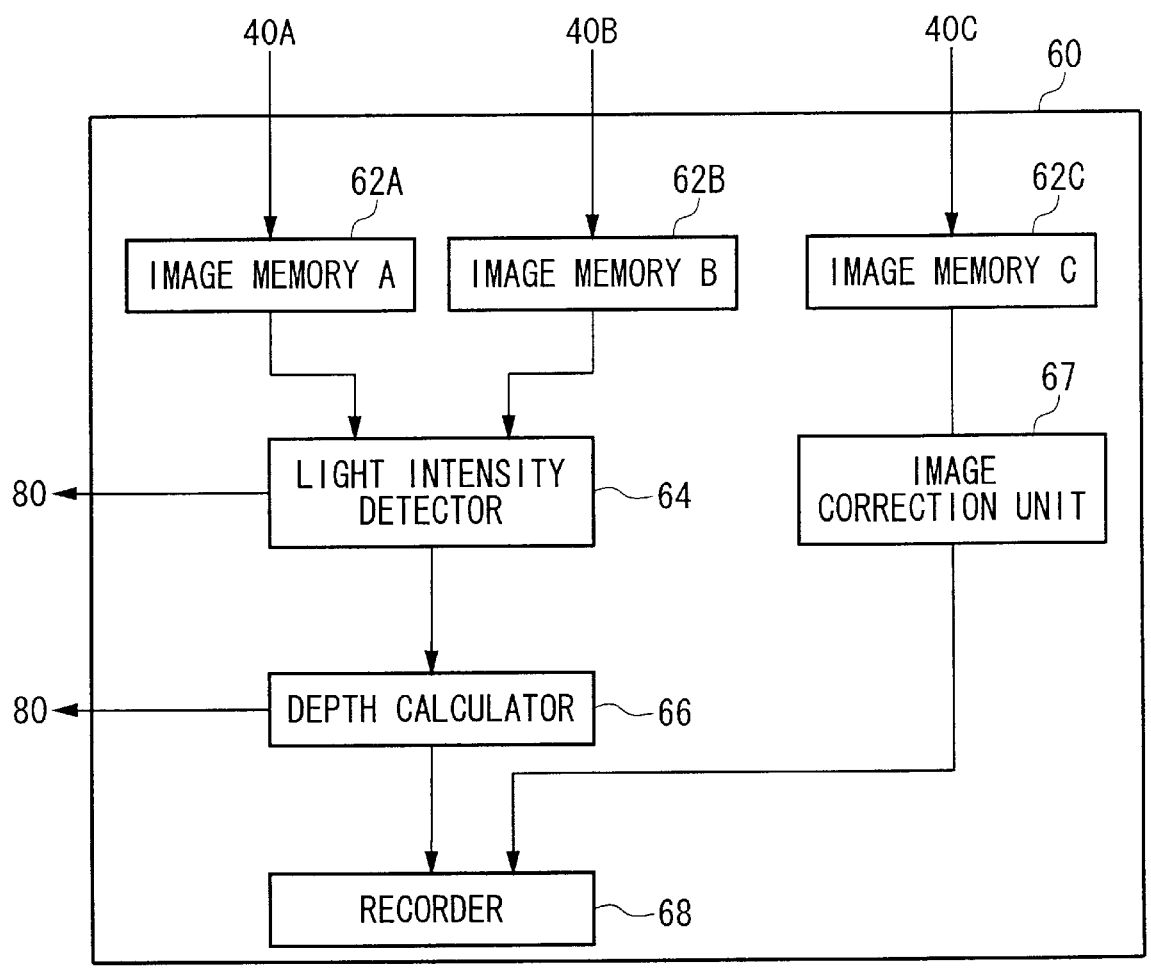
FIG. 21 is a diagram showing the structure of the processing unit 60 according to the third embodiment of the present invention.

FIG. 21 is a diagram showing the structure of the processing unit 60 in the present embodiment. The images of the subject output from the light-receiving units 40A and 40B are stored in the image memories 62A and 62B, respectively. The light intensity detector 64 detects the reflected-light intensities by using the image data stored in the respective image memories 62A and 62B, and the depth calculator 66 obtains the distance R1 to the region 4 of the object 2 from the light source 10A by using the reflected-light intensities detected by the light intensity detector 64. The operations of the light intensity detector 64 and the depth calculator 66 are similar to those in the second embodiment, and therefore the description therefor is omitted. The depth calculator 66 calculates, for each pixel or pixel area, the depth-direction distance to the region of the subject taken in the pixel or pixel area and then obtains the depth distribution of the subject so as to output the obtained depth distribution. The recorder 68 records the depth-distribution information of the subject. On the other hand, the image of the subject output from the light-receiving unit 40C is stored in the image memory 62C. The image correction unit 67 performs image correction, such as gray-scale correction, for the image data stored in the image memory 62C so as to output the corrected image data as image data of the subject. The recorder 68 records the image data of the subject together with the depth-distribution information of the subject.

In the above description, the reflected light having the wavelengths $\lambda_B$ and $\lambda_C$ is received by the light-receiving unit 40B without being separated by wavelength from each other. However, the light having the wavelength $\lambda_B$ and the light having the wavelength $\lambda_C$ may be separated by the separation unit 30. In this case, four panels of solid state image sensors may be used so as to allow the light having the wavelength $\lambda_B$ and the light having the wavelength $\lambda_C$ to be received by the different solid state image sensors, for example. Moreover, in this case, the depth-direction distance to the subject can be obtained by using the intensities of the reflected light beams respectively having the wavelengths $\lambda_A$, $\lambda_B$ and $\lambda_C$ in accordance with the same method as that described in the first embodiment.

As described above, according to the image capturing apparatus of the present embodiment, the infrared light is used for measuring the depth-direction of the subject. Thus, even in the conditions where the subject is also illuminated with natural light or light from lighting, the depth-direction distance of the subject can be measured. Therefore, it is not necessary to keep a room dark in order to measure the depth-direction distance of the subject. In addition, since the image of the subject carried by the reflected light in the visible region can be separated, the photographic image of the subject can be taken while the depth distribution of the subject is being measured. Thus, it is possible to perform an image processing for the subject using the depth distribution, for example, extraction of a main subject from the taken image based on the depth distribution or separation of a background and an image of a person.

Embodiment 4

Figure 22:
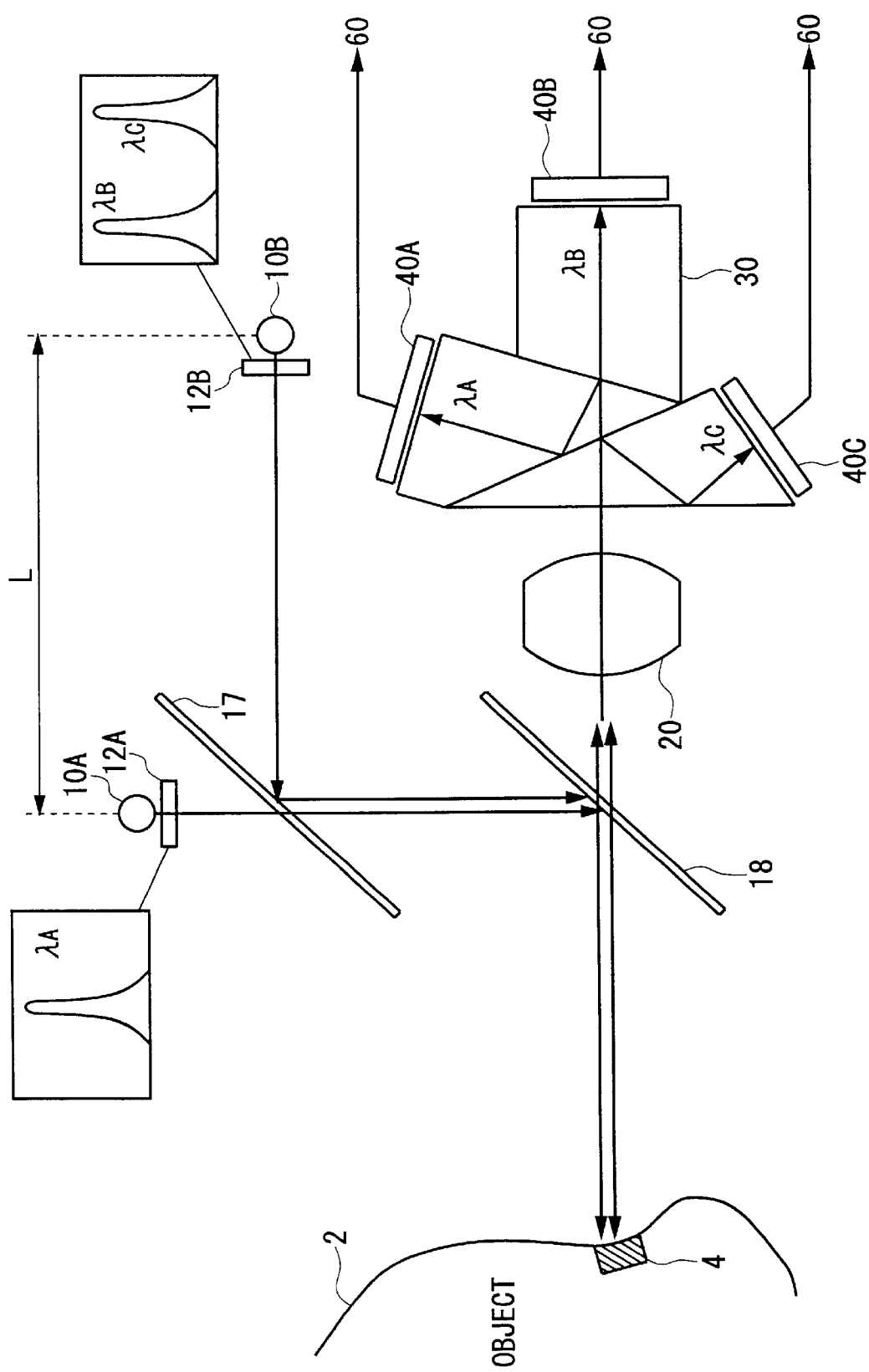
FIG. 22 is a diagram showing the arrangement of the illumination unit 100 and the capturing unit 120 according to the fourth embodiment of the present invention.

The fourth embodiment of the present invention is described. The image capturing apparatus of the present embodiment is the same as those described in the first, second and third embodiments except that half mirrors 17 and 18 are used in order to make the optical axis of the illumination unit 100 coincident with that of the capturing unit 120. FIG. 22 is a diagram showing the arrangement of the illumination unit 100 and capturing unit 120. Although this arrangement corresponds to an arrangement in which the half mirrors 17 and 18 are used in the arrangement in the first embodiment, the arrangements in the second and third embodiments can be modified in a similar manner. The emission positions of the light sources 10A and 10B of the illumination unit 100 are apart from each other by a distance L. The illumination light from the light source 10B is reflected by the half mirror 17 and the half mirror 18 in that order, and is then incident on the object 2. The illumination light from the light source 10A passes through the half mirror 17 and is then reflected by the half mirror 18, so as to be incident on the object 2. The light beams reflected from the subject pass the half mirror 18 and are then converged by the optical lens 20 of the capturing unit 120.

In the present embodiment, since the optical axis of the illumination unit 100 is made optically coincident with that of the capturing unit 120, there is no shadow region for which a image cannot be taken when the image of the subject illuminated with the illumination light from the illumination unit 100 is captured by the capturing unit 120. Therefore, the depth distribution can be calculated for all regions of the subject and there is no blind region for which the depth-direction distance cannot be calculated. In addition, the size of the whole image capturing apparatus 200 can be reduced by making the optical axis of the illumination unit 100 coincident with that of the capturing unit 120.

Figure 23:
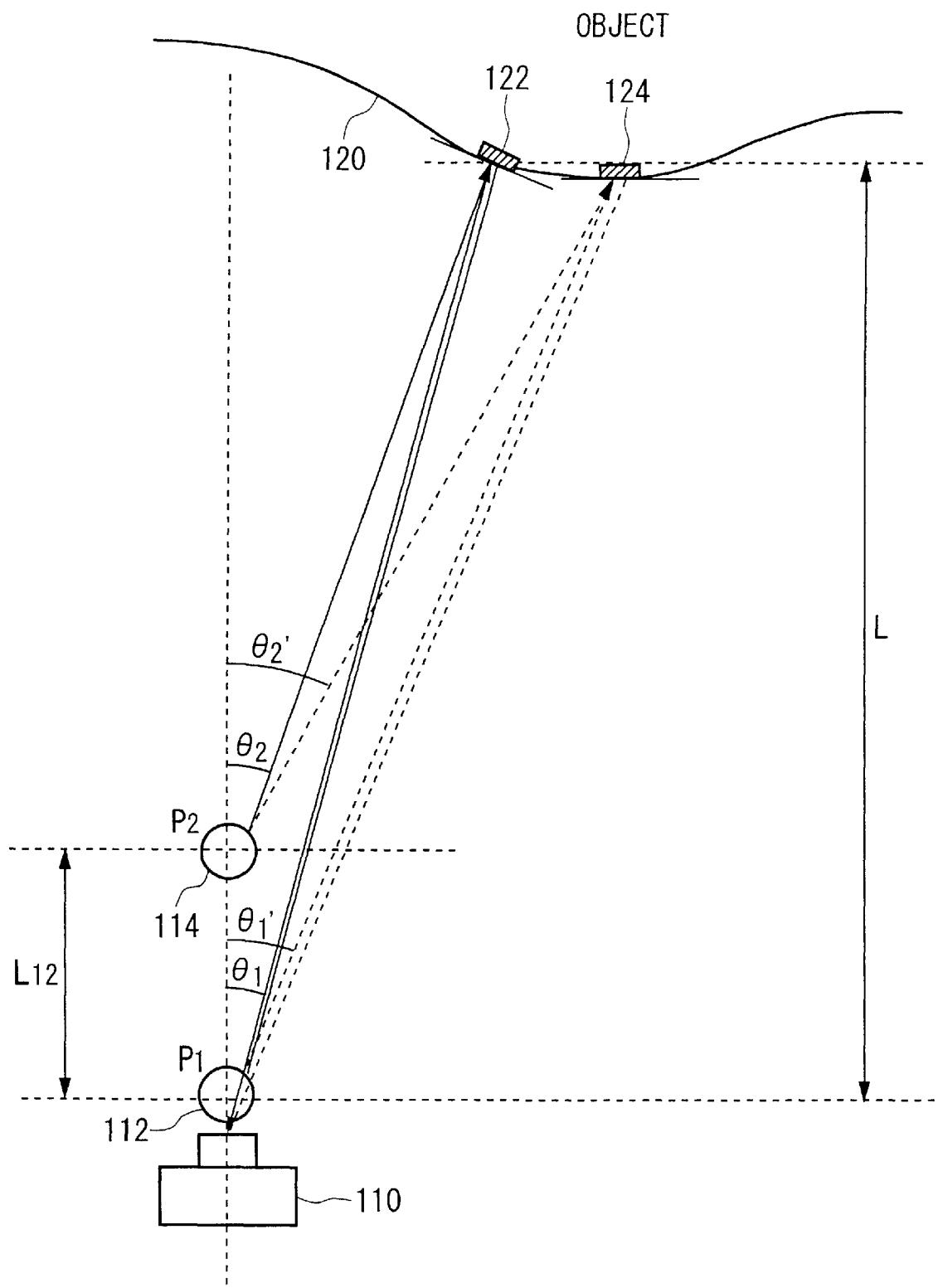
FIG. 23 is an explanatory view of the principle according to the fifth embodiment of the present invention.

FIG. 23 is an explanatory view of the principle according to the fifth embodiment of the present invention. Light beams having the intensities P1 and P2 are cast onto an object 120 from illumination positions 112 and 114, respectively. The light beams reflected from the object 120 are captured by a camera 110, respectively. The camera 110 is, for example, a charge-coupled device (CCD). The camera 110 includes a plurality of pixels and captures for each pixel the reflected light beams from a measured portion 122 of the object 120 and a portion 124 in the vicinity of the measured portion 122 to detect the intensities of the light beams for each pixel. Based on the reflected light beams captured by the camera 110, a distance L to the measured portion 122 of the object 120 and inclination $\theta_0$ and reflectivity $R_{obj}$ of the surface of the measured portion 122 are calculated. The illumination positions 112 and 114 may be arranged at any desired positions. Any one of cast angles at which the light beam are incident on the object 120 from the illumination positions 112 and 114. In this example, the cast angles of the light beams are calculated based on incident angles of the reflected light beams captured by the camera 110, while the camera 110 is arranged at optically the same position as any one of the illumination positions 112 and 114. A case where the camera 110 is arranged at optically the same position as the illumination position 112 is described in this example.

As shown in FIG. 23, the illumination position 114 is arranged apart from the illumination position 112 by a distance $L_{12}$. The distance $L_{12}$ is a known value unique to the measuring system. The cast angles at which the light beams are cast from the illumination positions 112 and 114 onto the measured portion 122 of the object 120 are assumed to be $\theta_1$ and $\theta_2$, respectively, and angles at which the light beams are cast from the illumination positions 112 and 114 onto the region 124 in the vicinity of the measured portion 122 of the object are assumed to be $\theta_{1'}$ and $\theta_{2'}$, respectively. In addition, since the camera 110 is arranged at optically the same position as the illumination position 112, when a receiving angle at which the camera 110 receives the light beams from the measured portion 122 and a receiving angle at which the camera 110 receives the light beams from the region 124 are assumed to be $\theta_c$ and $\theta_{c'}$, $\theta_c=\theta_1$ and $\theta_{c'}=\theta_{1'}$. Moreover, the distances from the illumination position 112 to the measured portion 122 and the region 124 are assumed to be $L_1$ and $L_{1'}$, respectively, and the distances from the illumination position 114 to the measured portion 122 and the region 124 are assumed to be $L_2$ and $L_{2'}$, respectively.

When the intensities of the light beams that were emitted from the illumination positions 112 and 114 and were then reflected from the measured portion 122 are assumed to be $D_1$ and $D_2$, the intensities $D_1$ and $D_2$ are given as follows.

$$D_1 = \frac{P_1 \cos(\theta_0 + \theta_1)}{4\pi L_1^2} R_{obj}$$

$$D_2 = \frac{P_2 \cos(\theta_0 + \theta_2)}{4\pi L_2^2} R_{obj}$$

From the above expressions, $$\frac{D_2}{D_1} = \frac{P_2 \cos(\theta_0 + \theta_2) L_1^2}{P_1 \cos(\theta_0 + \theta_1) L_2^2}$$

is obtained. Moreover, there exists the following relationship.

$$\frac{\sin\theta_2}{\sin\theta_1} = \frac{L_1}{L_2}$$

Thus, the following expression is obtained.

$$\frac{D_2}{D_1} = \frac{P_2 \cos(\theta_0 + \theta_2) \sin^2\theta_2}{P_1 \cos(\theta_0 + \theta_1) \sin^2\theta_1}$$

In addition, $$\tan\theta_2 = \frac{L\tan\theta_1}{L - L_{12}}$$

and $L_{12}$ and $\theta_1$ are known values. Therefore, $\theta_2$ is given as a function of L as follows.

$$\theta_2 = g_2(L)$$

Thus, the following expression is obtained.

$$\frac{D_2}{D_1} = \frac{P_2\cos(\theta_0 + g_2(L))\sin^2(g_2(L))}{P_1\cos(\theta_0 + \theta_1)\sin^2\theta_1}$$

Since $D_1$, $D_2$, $P_1$, $P_2$ and $\theta_1$ are measured or known values, unknown values in the above expression are $\theta_0$ and L only. Therefore, a combination of $\theta_0$ and L that satisfy the above expression can be obtained. In other words, when the distance L to the measured portion 122 is assumed to be a certain value, the inclination $\theta_0$ of the surface of the measured portion 122 corresponding to the assumed distance L can be calculated. Also, for the region 124 in the vicinity of the measured portion 122, a combination of the distance L' to the region 124 and the inclination $\theta_{0'}$ of the surface of the region 124 can be obtained.

According to the present invention, the distance L to the measured portion 122 of the object 120 and the surface inclination $\theta_0$ of the measured portion 122 are calculated based on the combination of the distance L to the measured portion 122 and the surface inclination $\theta_0$ of the measured portion 122 and the combination of the distance L' to the region 124 in the vicinity of the measured portion 122 of the object 120 and the surface inclination $\theta_{0'}$ of the region 124. The calculation method is described in detail below.

Figure 24:
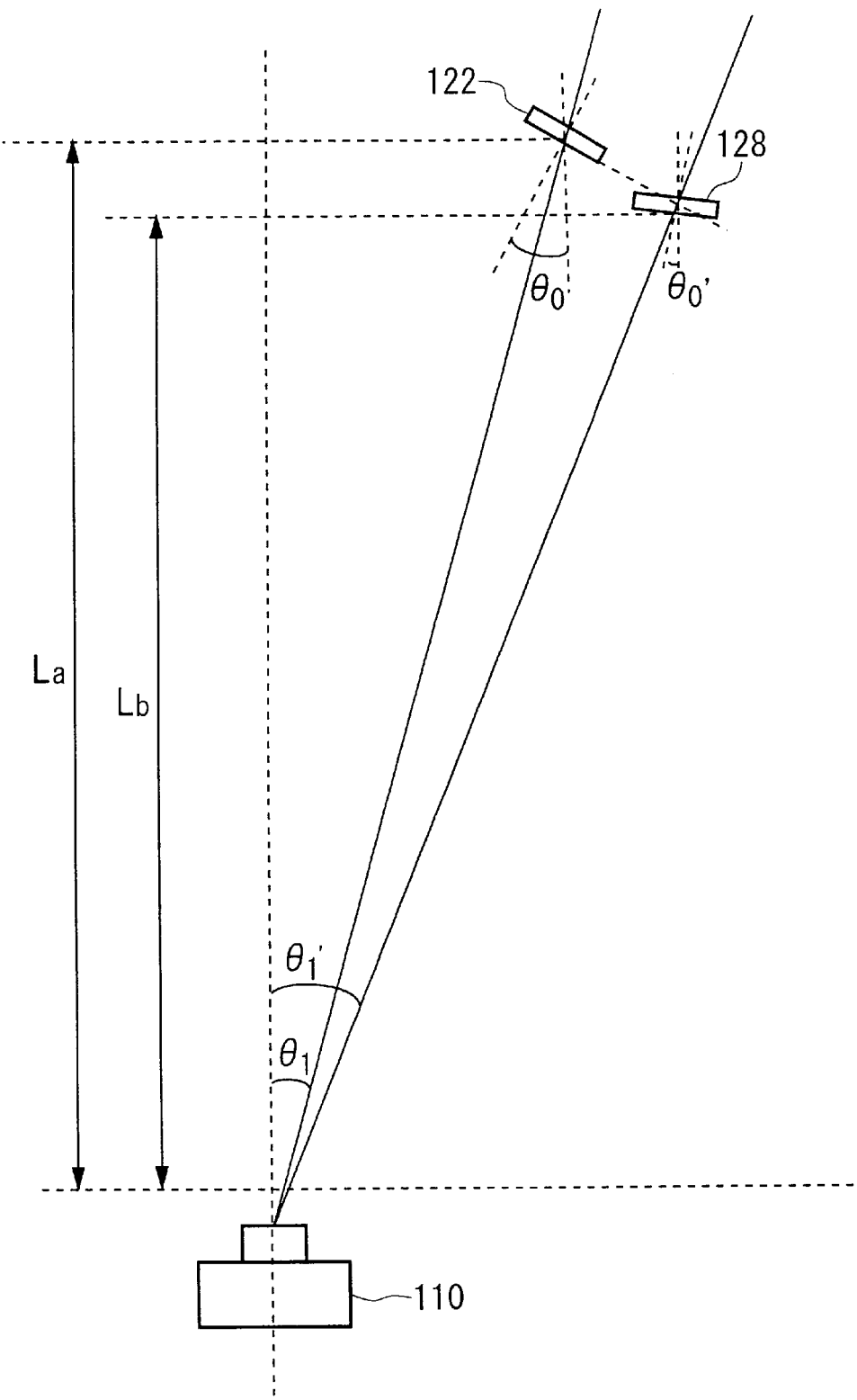
FIG. 24 is a drawing for explaining an exemplary method for calculating the distance L to the measured portion 122 and the surface inclination $\theta_0$ of the measured portion 122.

FIG. 24 is a drawing for explaining an exemplary method for calculating the distance L to the measured portion 122 and the surface inclination $\theta_0$ of the measured portion 122. First, the distance L to the measured portion 122 is assumed to be La. Based on the expressions described referring to FIG. 23, the surface inclination $\theta_0$ of the measured portion 122 corresponding to the assumed distance La is calculated. Next, an assumed distance Lb, that is a distance to the region 124 in the vicinity of the measured portion 122 in a case where the region 124 is assumed to exist at a crossing point at which a surface obtained by extending the surface of the measured portion 122 determined by the calculated surface inclination $\theta_0$ crosses the optical path of the reflected light beams from the region 124, is calculated. The assumed distance Lb to the region 124 can be geometrically calculated based on the assumed distance La between the camera 110 and the measured portion 122, the incident angle $\theta_1$ of the reflected light beams onto the camera 110 from the measured portion 122, the incident angle $\theta_{1'}$ of the reflected light beams onto the camera 110 from the region 124 and the surface inclination $\theta_0$ of the measured portion 122.

Then, the surface inclination $\theta_{0'}$ of the region 124 that corresponds to the assumed distance Lb calculated as mentioned above is calculated. The surface inclination $\theta_{0'}$ can be calculated from the expressions described referring to FIG. 23. Since the distance between the measured portion 122 and the region 124 in the vicinity of the measured portion 122 of the object 120 is very small, the surface inclination of the measured portion 122 is approximately the same as that of the region 124. Thus, it can be determined whether or not the assumed distance La to the measured portion 122 is accurate by comparing the calculated surface inclinations $\theta_0$ and $\theta_{0'}$ with each other. More specifically, the difference between the surface inclinations $\theta_0$ and $\theta_{0'}$ falls within a predetermined range, the assumed distance La can be considered as the actual distance L to the measured portion 122.

In a case where the difference between the surface inclinations $\theta_0$ and $\theta_{0'}$ does not fall within the predetermined range, it is considered that the assumed distance La is not appropriate. Thus, the distance L to the measured portion 122 is assumed to be another value, and similar calculations are performed again. It is apparent that the distance L to the measured portion 122 that satisfies the expressions described referring to FIG. 1 has an upper limit, and a lower limit is zero. Therefore, it is sufficient to perform calculations for the assumed distances La in a limited range. For example, the actual distance L to the measured portion 122 may be extracted by binary search for the distances La in the limited range. Also, the actual distance L may be extracted by calculating the difference between the surface inclinations $\theta_0$ and $\theta_{0'}$ for the assumed distances La in the limited range at predetermined distance intervals of La. Also, the differences between the surface inclinations $\theta_0$ and $\theta_{0'}$ may be calculated for various assumed distances La so that the assumed distance La providing the smallest difference is considered to be the actual distance L. In addition, information of the surface inclination of the measured portion can be calculated from the expressions described referring to FIG. 23 based on the information of the distance to the measured portion. Moreover, the information of the surface reflectivity of the measured portion can be calculated from the expressions described referring to FIG. 1.

Figure 25:
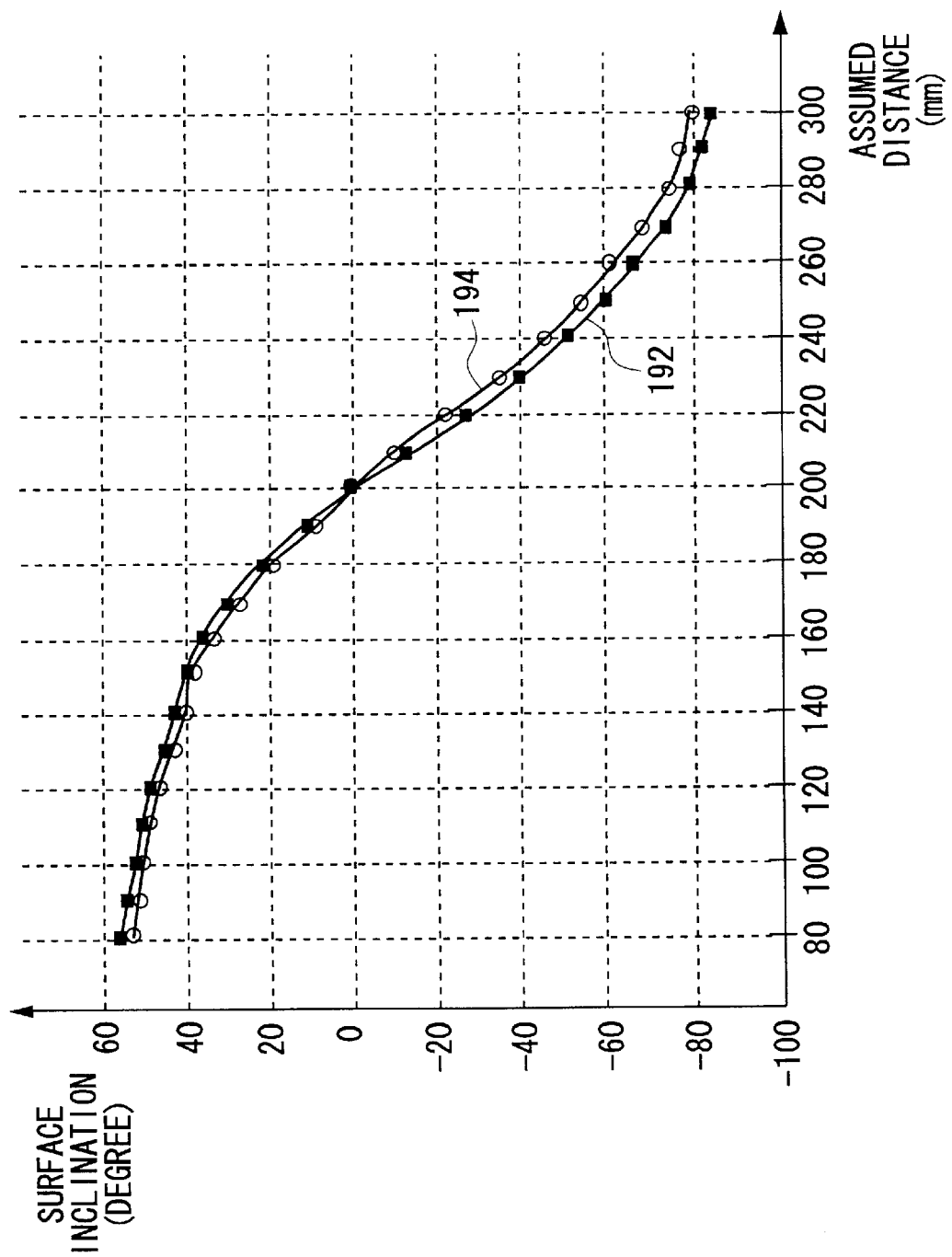
FIG. 25 shows exemplary results of calculations of the surface inclinations $\theta_0$ and $\theta_0$, for the assumed distances La in the predetermined range at predetermined distance intervals.

FIG. 25 shows exemplary results of calculations of the surface inclinations $\theta_0$ and $\theta_{0'}$ for the assumed distances La in the predetermined range at predetermined distance intervals. In the graph of FIG. 25, the horizontal axis represents the assumed distance La to the measured portion 122 while the vertical axis represents the surface inclinations $\theta_0$ and $\theta_{0'}$ of the measured portion 122 and the region 124. In this example, the distance L to the measured portion 122 of the object 120 was set to 200 mm, and the surface inclination of the measured portion 122 was set to 0 degree. Moreover, the calculations were performed while the distance between the illumination positions 112 and 114 was set to 10 mm, $\theta_1$ was set to 20 degrees and the interval of the assumed distances La was set to 10 mm.

Data 192 shows the surface inclination of the measured portion 122 corresponding to the assumed distance La represented by the horizontal axis. Data 194 shows the surface inclination of the region 124 in the vicinity of the measured portion 122. When the assumed distance is 200 mm, the surface inclination of the measured portion 122 is zero degree, while being coincident with that of the region 124 in the vicinity of the measured portion 122.

Figure 26:
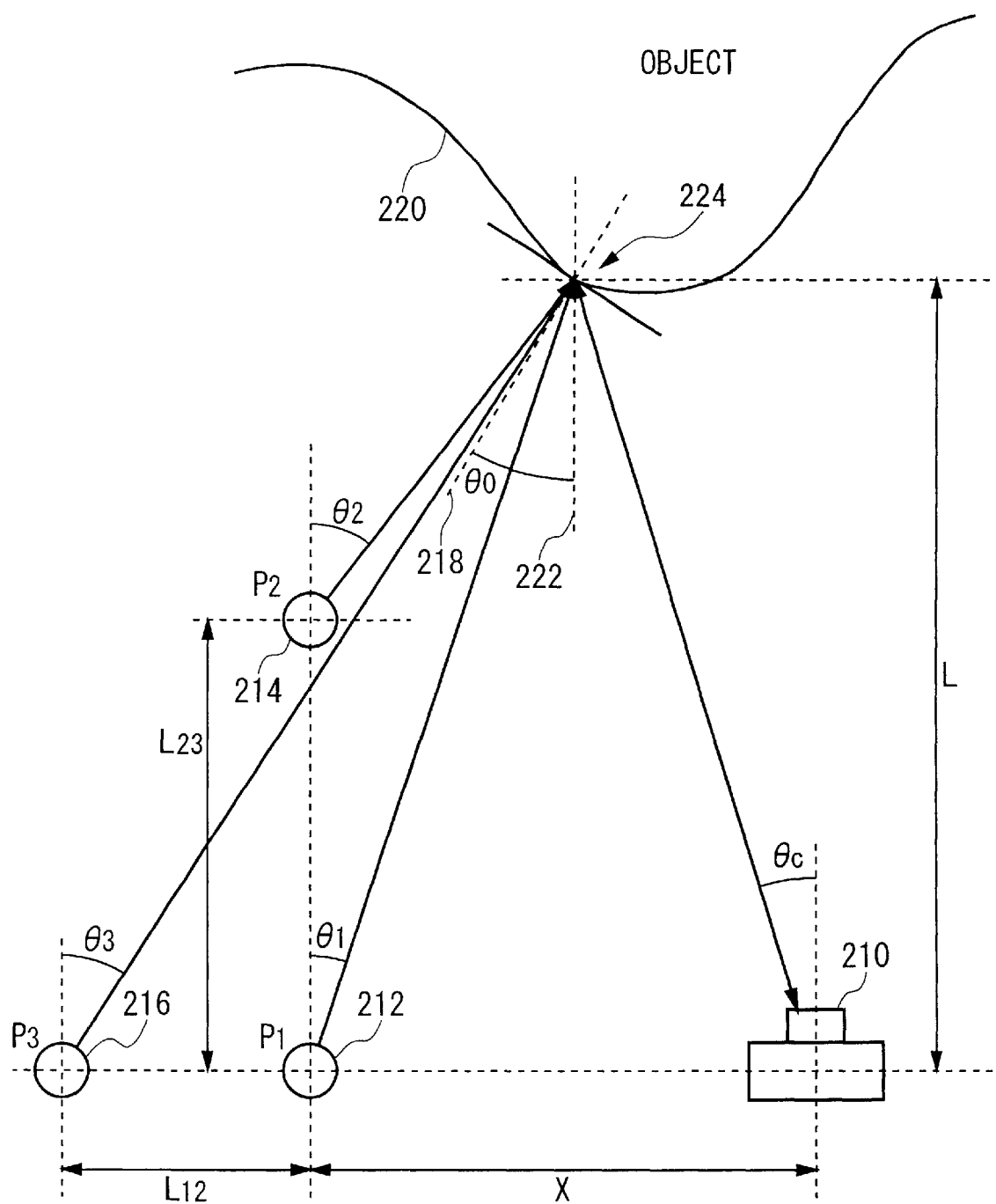

FIG. 26 is an explanatory view of the principle according to a sixth embodiment showing an information obtaining method for obtaining distance information regarding a distance to an object and the like. Light beams having the intensities P1, P2 and P3 are cast onto an object 220 from illumination positions 212, 214 and 216, respectively. The light beams reflected by the object 220 are captured by a camera 210, respectively. The camera 210 is, for example, a charge-coupled device (CCD). The camera 210 includes a plurality of pixels each of which captures the reflected light beams from an illuminated portion 224 of the object 220, and detects the intensities of the light beams for each pixel. Based on the reflected light beams captured by the camera 210, a distance L to the illuminated portion 224 of the object 220 and inclination $\theta_0$ and reflectivity $R_{obj}$ of the surface of the illuminated portion 224 are calculated. Although the illumination positions 212, 214 and 216 and the camera 210 are arranged at any desired positions, a case where the illumination positions 212 and 216 and the camera 210 are arranged on the same straight line is described in this example.

As shown in FIG. 26, the illumination position 216 is arranged apart from the illumination position 212 by a distance $L_{12}$, while the illumination position 214 is arranged apart from the illumination position 212 by a distance $L_{23}$. The camera 210 is arranged apart form the illumination position 212 by a distance X. The distances $L_{12}$, $L_{23}$ and X are known values unique to the measuring system. In addition, angles at which the light beams are cast from the illumination positions 212, 214 and 216 onto the illuminated portion 224 of the object 220 are $\theta_1$, $\theta_2$ and $\theta_3$, respectively, while an angle at which the camera 210 receives the reflected light beams from the illuminated portion 224 is $\theta_c$. Please note that the angle $\theta_c$ is calculated based on the reflected light beams captured for each pixel by the camera 210. Distances from the illumination positions 212, 214 and 216 to the illuminated portion 224 of the object 220 are $L_1$, $L_2$ and $L_3$, respectively.

Assuming that the intensities of the light beams that were emitted from the illumination positions 212, 214 and 216 and were then reflected from the illuminated portion 224 are $D_1$, $D_2$ and $D_3$, respectively, the intensities $D_1$, $D_2$ and $D_3$ are obtained as follows.

$$D_1 = \frac{P_1 f(\theta_0, \theta_1, \theta_c)}{4\pi L_1^2} R_{obj}$$

$$D_2 = \frac{P_2 f(\theta_0, \theta_2, \theta_c)}{4\pi L_2^2} R_{obj}$$

$$D_3 = \frac{P_3 f(\theta_0, \theta_3, \theta_c)}{4\pi L_3^2} R_{obj}$$

Thus, $\dfrac{D_2}{D_1} = \dfrac{P_2 f(\theta_0, \theta_2, \theta_c) L_1^2}{P_1 f(\theta_0, \theta_1, \theta_c) L_2^2}$ $$\frac{D_3}{D_1} = \frac{P_3 f(\theta_0, \theta_3, \theta_c) L_1^2}{P_1 f(\theta_0, \theta_1, \theta_c) L_3^2}$$

where f( ) represents a function. In addition, there exist the following relationships.

$$\frac{\cos\theta_3}{\cos\theta_1} = \frac{L_1}{L_3}$$

$$\frac{\sin\theta_2}{\sin\theta_1} = \frac{L_1}{L_2}$$

Thus, the following expressions are obtained.

$$\frac{D_2}{D_1} = \frac{P_2 f(\theta_0, \theta_2, \theta_c)\sin^2\theta_2}{P_1 f(\theta_0, \theta_1, \theta_c)\sin^2\theta_1}$$

$$\frac{D_3}{D_1} = \frac{P_3 f(\theta_0, \theta_3, \theta_c)\cos^2\theta_3}{P_1 f(\theta_0, \theta_1, \theta_c)\cos^2\theta_1}$$

Moreover, $$\tan\theta_1 = \frac{X - L\tan\theta_c}{L}$$

$$\tan\theta_2 = \frac{X - L\tan\theta_c}{L - L_{23}}$$

$$\tan\theta_3 = \frac{L_{12} + X - L\tan\theta_c}{L}$$

where X, $L_{12}$ and $\theta_c$ are known values. Therefore, $\theta_1$, $\theta_2$ and $\theta_3$ are given as functions of L.

$$\theta_1 = g_1(L)$$

$$\theta_2 = g_2(L)$$

$$\theta_3 = g_3(L)$$

Thus, the following relationships are realized between $D_1$, $D_2$ and $D_3$.

$$\frac{D_2}{D_1} = \frac{P_2 f(\theta_0, g_2(L), \theta_c)\sin^2(g_2(L))}{P_1 f(\theta_0, g_1(L), \theta_c)\sin^2(g_1(L))}$$

$$\frac{D_3}{D_1} = \frac{P_3 f(\theta_0, g_3(L), \theta_c)\cos^2(g_3(L))}{P_1 f(\theta_0, g_1(L), \theta_c)\cos^2(g_1(L))}$$

Since $D_1$, $D_2$, $D_3$, $\theta_c$, $P_1$, $P_2$ and $P_3$ are measured or known values, unknown values $\theta_0$ and L can be obtained from the above two expressions. When $\theta_0$ is obtained, $R_{obj}$ can be obtained from any one of the expressions of $D_1$, $D_2$ and $D_3$. As described above, information of the distance to the object, information of inclination and reflectivity of the surface of the object can be calculated by capturing the light beams that were cast from optically different three or more illumination positions onto the object and then were reflected from the object.

Although the illumination positions 212 and 216 and the camera 16 are arranged on the same straight line in this example, it is apparent that the information of the distance to the object and the information of the inclination and reflectivity of the surface of the object can be calculated from the reflected light beams as long as the distances between respective elements.

In accordance with the information obtaining method as described above, the information of the distance to the object 220 can be obtained while errors caused by the inclination of the surface of the object 220 or the like are eliminated. In addition, the information of the inclination of the surface of the object and the information of the reflectivity of the surface of the object 220 can be obtained.

Please note that the information of the distance to the object and the like cannot be calculated by the method described referring to FIG. 26 when the illumination positions 212, 214 and 216 are arranged on the same straight line. Next, a method for obtaining the information of the distance to the object, the information of the inclination of the surface of the object and the information of the reflectivity of the surface of the object in a case where the illumination positions 212, 214 and 216 are arranged on the same straight line is described.

Figure 27:
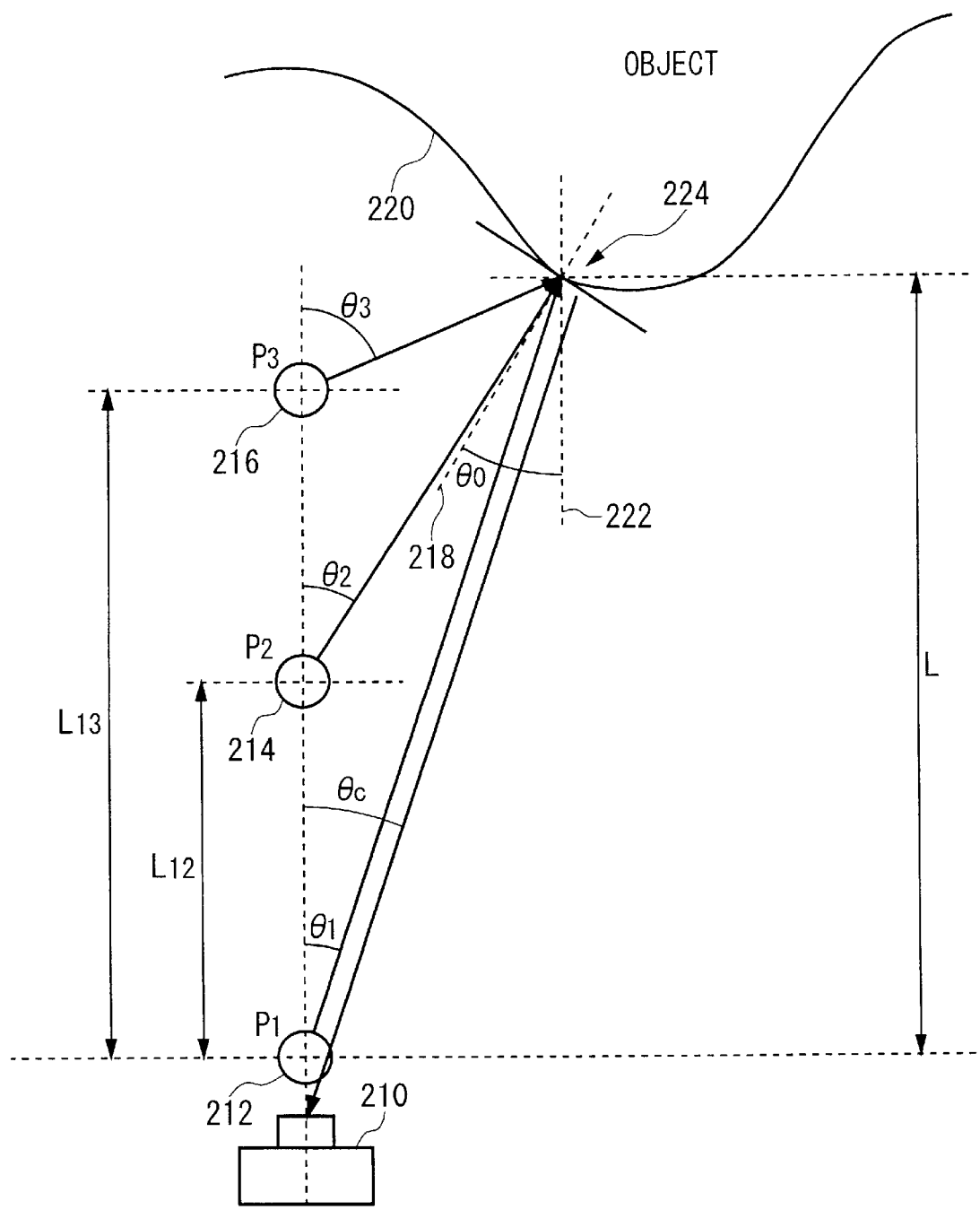
FIG. 27 is a drawing for explanation of the information obtaining method for obtaining the information of the distance to the object and the like in the case where the illumination positions are arranged on the same straight line.

FIG. 27 is a drawing for explanation of the information obtaining method for obtaining the information of the distance to the object and the like in the case where the illumination positions are arranged on the same straight line. The light beams having the intensities $P_1$, $P_2$ and $P_3$ are cast from the illumination positions 212, 214 and 216 onto the object 220, and the reflected light beams from the object 220 are captured by the camera 210.

As shown in FIG. 27, the illumination positions 216 and 214 are arranged apart from the illumination position 212 by distances $L_{13}$ and $L_{12}$, respectively, while the camera 210 is arranged at substantially the same position as the illumination position 212. The distances $L_{12}$ and $L_{13}$ are known values unique to the measuring system. Angles at which the light beams are cast onto the illuminated portion 224 of the object 220 from the illumination positions 212, 214 and 216 are assumed to be $\theta_1$, $\theta_2$ and $\theta_3$, respectively, and an angle at which the camera 210 receives the reflected light beams from the illuminated portion 224 is assumed to be $\theta_c$. $\theta_c$ is calculated based on the reflected beams captured for each pixel by the camera 210. In this example, $\theta_c = \theta_1$ since the camera 210 is arranged at substantially the same position as the illumination position 212. In addition, it is assumed that the distances to the illuminated portion 224 from the illumination positions 212, 214 and 216 are $L_1$, $L_2$ and $L_3$, respectively.

When it is assumed that the intensities of the light beams that were cast from the illumination positions 212, 214 and 216 and were then reflected from the illuminated portion 224 are $D_1$, $D_2$ and $D_3$, respectively, the intensities $D_1$, $D_2$ and $D_3$ are obtained as follows.

$$D_1 = \frac{P_1 \cos(\theta_0 + \theta_1)}{4\pi L_1^2} R_{obj}$$

$$D_2 = \frac{P_2 \cos(\theta_0 + \theta_2)}{4\pi L_2^2} R_{obj}$$

$$D_3 = \frac{P_3 \cos(\theta_0 + \theta_3)}{4\pi L_3^2} R_{obj}$$

From the above expressions, $$\frac{D_2}{D_1} = \frac{P_2 \cos(\theta_0 + \theta_2) L_1^2}{P_1 \cos(\theta_0 + \theta_1) L_2^2}$$

$$\frac{D_3}{D_1} = \frac{P_3 \cos(\theta_0 + \theta_3) L_1^2}{P_1 \cos(\theta_0 + \theta_1) L_3^2}$$

are obtained. Moreover, there exist the following relationships.

$$\frac{\sin\theta_3}{\sin\theta_1} = \frac{L_1}{L_3}$$

$$\frac{\sin\theta_2}{\sin\theta_1} = \frac{L_1}{L_2}$$

Thus, the following expressions are obtained.

$$\frac{D_2}{D_1} = \frac{P_2 \cos(\theta_0 + \theta_2)\sin^2\theta_2}{P_1 \cos(\theta_0 + \theta_1)\sin^2\theta_1}$$

$$\frac{D_3}{D_1} = \frac{P_3 \cos(\theta_0 + \theta_3)\sin^2\theta_3}{P_1 \cos(\theta_0 + \theta_1)\sin^2\theta_1}$$

In addition, $$(L - L_{12})\tan\theta_2 = L\tan\theta_1$$

$$(L - L_{13})\tan\theta_3 = L\tan\theta_1$$

and $\theta_1$ is equal to $\theta_c$, and $L_{12}$, $L_{13}$ and $\theta_c$ are known. Therefore, $\theta_2$ and $\theta_3$ are given as functions of L.

$$\theta_2 = \tan^{-1}\left(\frac{L\tan\theta_1}{L - L_{12}}\right) = g_4(L)$$

$$\theta_3 = \tan^{-1}\left(\frac{L\tan\theta_1}{L - L_{13}}\right) = g_5(L)$$

Thus, the following expressions are obtained.

$$\frac{D_2}{D_1} = \frac{P_2 \cos(\theta_0 + g_4(L))\sin^2(g_4(L))}{P_1 \cos(\theta_0 + \theta_c)\sin^2\theta_c}$$

$$\frac{D_3}{D_1} = \frac{P_3 \cos(\theta_0 + g_5(L))\sin^2(g_5(L))}{P_1 \cos(\theta_0 + \theta_c)\sin^2\theta_c}$$

Since $D_1$, $D_2$, $D_3$, $\theta_c$, $P_1$, $P_2$ and $P_3$ are measured or known values, unknown values $\theta_0$ and L can be obtained from the above two expressions. When $\theta_0$ is obtained, $R_{obj}$ can be obtained from any one of the expressions of $D_1$, $D_2$ and $D_3$. As described above, the information of the distance to the object, the information of the inclination of the surface of the object, and the information of the reflectivity of the surface of the object can be calculated by capturing the light beams, that were cast from the three illumination positions optically arranged on the same straight line and were then reflected from the object 220, at substantially the same position as any one of the three illumination positions. Although the illumination position 212 and the position of the camera 210 are substantially the same in this example, since the same effects can be obtained by making $\theta_c$ equal to any one of $\theta_1$, $\theta_2$ and $\theta_3$, it is apparent that the position of the camera 210 is substantially the same as any one of the illumination positions 14 and 16.

In the information obtaining method described referring to FIG. 27, the camera 210 has an optical axis optically coincident with an optical axis of any one of the illumination positions 212, 214 and 216. Thus, when the object 220 onto which the light beams are cast from the illumination positions 212, 214 and 216 is captured, a region that cannot be captured because it is shaded can be reduced. In addition, by arranging the camera 210 at substantially the same position as any one of the illumination positions 212, 214 and 216, the measurement of the distances between the camera 210 and the illumination positions in advance can be made unnecessary, and it is possible to reduce the error in the measurement of the distance between the camera 210 and the illumination positions.

In the information obtaining methods described referring to FIGS. 26 and 27, the light beams are cast from the three illumination positions onto the object 220. Alternatively, light beams can be cast onto the subject 20 from three or more illumination positions. In addition, it is preferable to calculate the information of the distance to the object 220, the information of the inclination of the surface of the object, and the information of the reflectivity of the surface of the object 220 based on the intensities of the reflected light beams. Moreover, distributions may be calculated for the information of the distance to the object, the information of the inclination of the surface of the object, and the information of the reflectivity of the surface of the object 220 after the distance information, the inclination information and the reflectivity information for the object 220 are calculated.

Furthermore, in the information obtaining method described referring to FIGS. 26 and 27, the light beams emitted from the three illumination positions may contain different wavelength components as main components, and the light beams may be emitted from the respective illumination positions to the object 220 substantially at the same time. It is preferable that the camera 210 may include wavelength selectors that can selectively transmit different wavelength light beams, respectively, so as to capture the light beams that were emitted from the respective wavelength light beams and were then reflected from the object 220. By casting the light beams containing different wavelength components as main components onto the object 220, it is possible to obtain the distance information, the inclination information and the reflectivity information even if the object is moving. However, since the reflectivity of the surface of the object 220 varies depending on the wavelength, the measurement result may contain an error. In order to reduce the error, it is necessary to correct the difference of the reflectivity between the wavelengths.

Figure 28A:
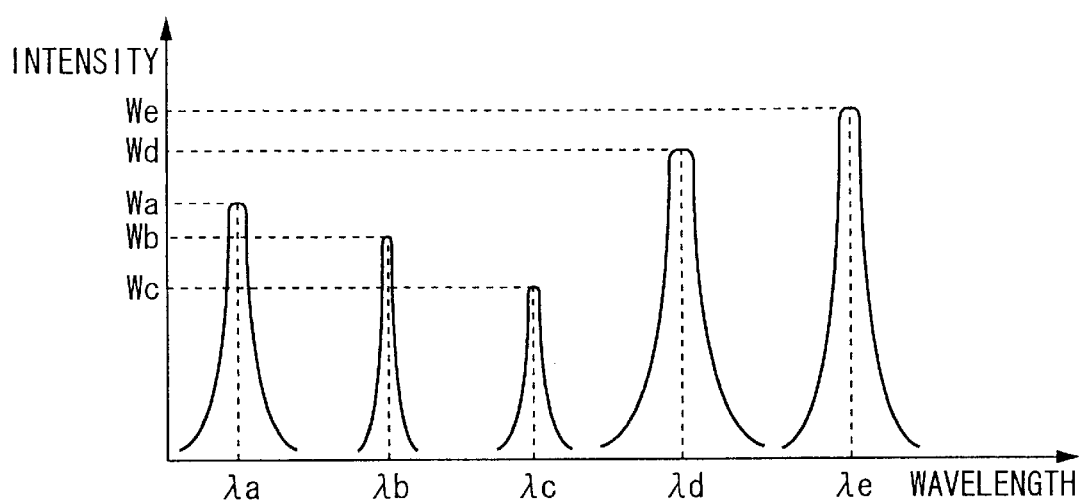
FIGS. 28A, 28B and 28C are drawings for explanation of an information obtaining method in which the difference of the reflectivity of the surface of the object 220 between the wavelengths is corrected.
Figure 28B:
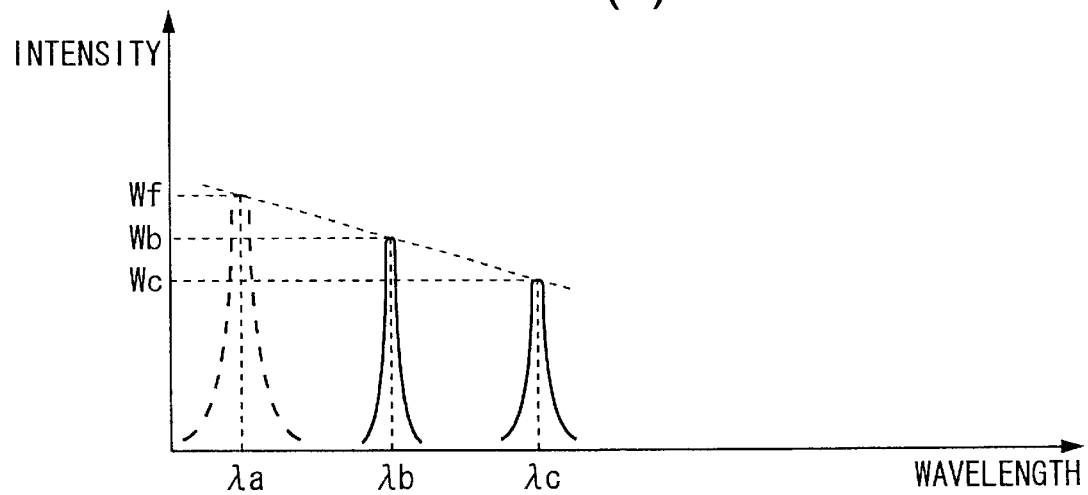
Figure 28C:
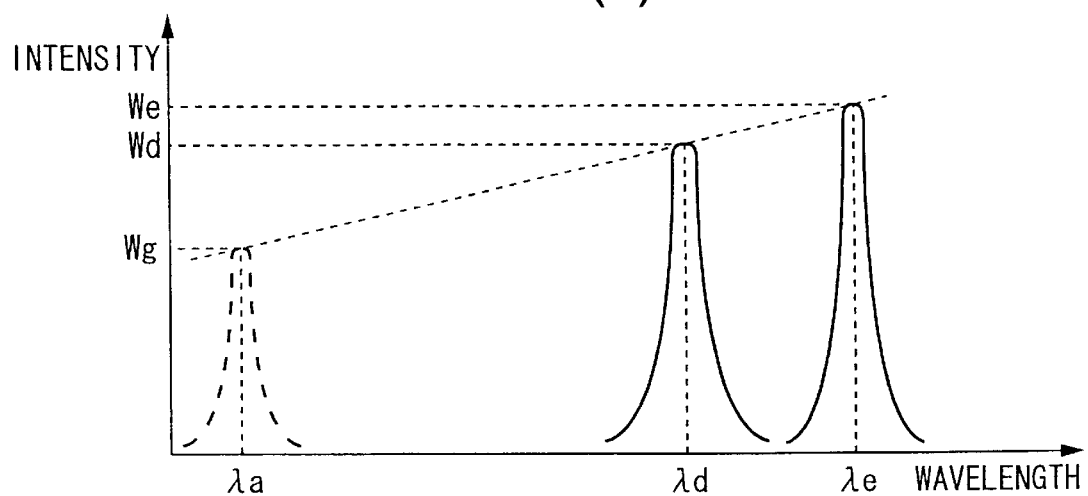

FIGS. 28A, 28B and 28C are drawings for explanation of an information obtaining method in which the difference of the reflectivity of the surface of the object 220 between the wavelengths is corrected. As an example, the wavelength of the light beam emitted from the illumination position 212 is assumed to be $\lambda_a$; the wavelengths of the light beams emitted from the illumination position 214 are assumed to be $\lambda_b$ and $\lambda_c$; and the wavelengths of the light beams emitted from the illumination position 216 are assumed to be $\lambda_d$ and $\lambda_e$. In addition, the intensities of the light beams from the illumination positions 212, 214 and 216 are assumed to be $P_1$, $P_2$ and $P_3$, while the intensities of the reflected light beams for the respective wavelengths are assumed to be $W_a$, $W_b$, $W_c$, $W_d$ and $W_e$. As shown in FIG. 28B, based on the intensities $W_b$ and $W_c$ of the light beams having the wavelengths $\lambda_b$ and $\lambda_c$ that were illuminated from the illumination position 214 with the intensity $P_2$, the intensity $W_f$ of a reflected light beam in a case where a light beam having the wavelength $\lambda_a$ is emitted from the illumination position 214 with the intensity $P_2$ is calculated. Although the intensity $W_f$ is calculated based on the wavelengths $\lambda_b$ and $\lambda_c$ in this example, the intensity $W_f$ may be calculated based on wavelength components more than the above. Similarly, the intensity $W_g$ of a reflected light beam in a case where a light beam having the wavelength $\lambda_a$ is emitted from the illumination position 214 with the intensity $P_3$ is calculated based on the intensities $W_d$ and $W_e$ of the light beams that were emitted from the illumination position 216 with the intensity $P_3$ and were then reflected from the object. Based on the calculated intensities $W_b$ and $W_c$ and the detected intensity $W_a$, the information of the distance to the object 220, the information of the inclination of the surface of the object, and the information of the reflectivity of the surface of the object 220 are calculated. In accordance with the above-described information obtaining method, the light beams are simultaneously emitted from the three illumination positions. Thus, even if the object is moving, the distance information, the inclination information and the reflectivity information can be obtained with high accuracy.

Figure 29:
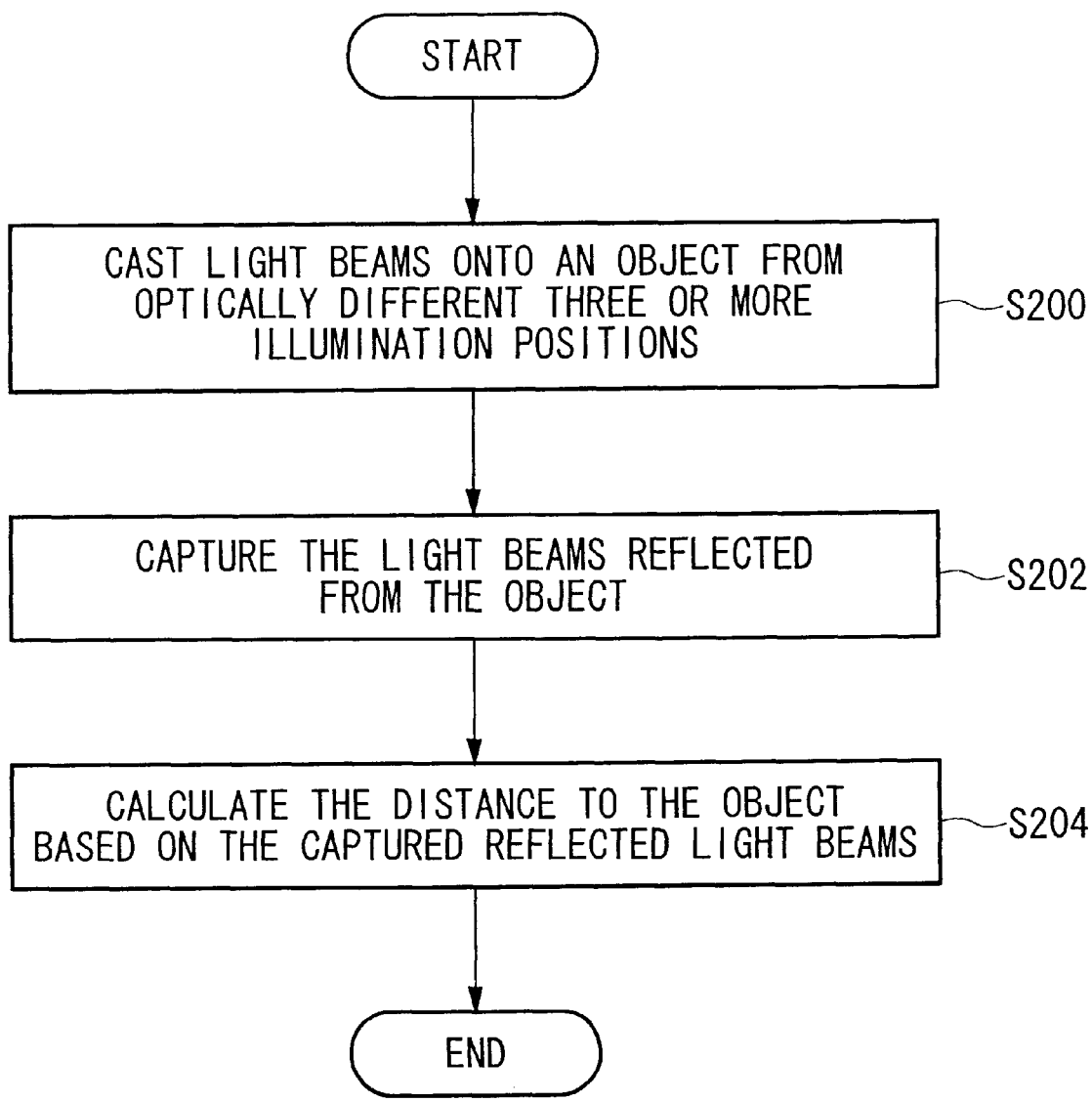
FIG. 29 is a flowchart showing an exemplary flow of the information obtaining method according to the present invention.

FIG. 29 is a flowchart showing an exemplary flow of the information obtaining method according to the present invention. The information obtaining method in this example includes an illumination step (S200), a capturing step (S202) and a calculation step (S204).

In the illumination step (S200), the light beams are cast from the optically different three or more illumination positions onto the object 220, as described referring to FIG. 26. In the capturing step (S202), the light beams that were emitted from the three or more illumination positions and were then reflected from the object are captured. In the calculation step (S204), the information of the distance to the object 220, the information of the inclination of the surface of the object 220 and the information of the reflectivity of the surface of the object 220 are calculated based on the reflected light beams captured in the capturing step.

In the illumination step (S200), the light beams may be cast onto the object 220 from the three illumination positions arranged on optically the same straight line, like the information obtaining means described referring to FIG. 27. In the capturing step (S202), the reflected light beams may be captured at optically the same position as any one of the three or more illumination positions.

In the calculation step (S204), the information of the distance to the object 220, the information of the inclination of the surface of the object 220 and the information of the surface reflectivity of the object 220 may be calculated, as described referring to FIGS. 26 and 27. Moreover, in the illumination step (S200) the light beams may be emitted from the three illumination positions optically forming a triangle.

In addition, in the illumination step (S200), the light beams having different wavelengths may be emitted from the respective illumination positions at substantially the same time, like the information obtaining method described referring to FIG. 28. In this case, in the capturing step (S202), it is preferable that wavelength selectors that can selectively transmit the different wavelength components, respectively, may be used so as to allow the reflected light beams to be captured separately from each other.

As described above, according to the image capturing apparatus and the distance measuring method of the present invention, the depth of the subject can be easily calculated by illuminating the subject with the light beams having different wavelength characteristics from different emission positions simultaneously, separating the reflected light beams from the subject in accordance with the wavelength characteristics optically, and measuring the intensities of the separated reflected light beams.

In the above description, the distance to the subject is obtained based on the difference of the intensity between the reflected light beams as an example of outgoing light beams from the subject that is illuminated with light. However, in a case where the subject is a transparent or semitransparent object that can transmit the light, the depth of the subject can be obtained by the difference of the intensity between the transmitted light beams.

As described above, according to the present invention, the depth of a subject can be easily measured by capturing outgoing light from the subject illuminated with light.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus for obtaining information regarding a depth of a subject, comprising:
   an illumination unit operable to cast a first illumination light beam mainly having a first wavelength and a second illumination light beam mainly having a second wavelength and a third wavelength from optically different emission positions onto said subject, said second and third wavelengths being different from said first wavelength; and
   a depth calculator operable to calculate a depth-direction distance to said subject based on outgoing light beams from said subject.

2. An image capturing apparatus as claimed in claim 1, wherein said illumination unit casts said first and second illumination light beams onto said subject simultaneously.

3. An image capturing apparatus as claimed in claim 2, further comprising:
   an optically converging unit operable to converge said outgoing light beams from said subject onto which said first and second illumination light beams are cast;
   a separation unit operable to optically separate said outgoing light beams from said subject into a first outgoing light beam having said first wavelength, a second outgoing light beam having said second wavelength and a third outgoing light beam having said third wavelength;
   a light-receiving unit operable to receive said first, second and third outgoing light beams that are separated by said separation unit and are converged by said optically converging unit; and
   a light intensity detector operable to detect intensities of said first, second and third outgoing light beams received by said light-receiving unit,
   wherein said depth calculator calculates the depth-direction distance to said subject by using the intensities of said first, second and third outgoing light beams.

4. An image capturing apparatus as claimed in claim 3, wherein said light-receiving unit includes three panels of solid state image sensors, and
   said separation unit separates said first, second and third outgoing light beams by using an optical path splitter so as to allow said first, second and third outgoing light beams to be received by said three panels of solid state image sensors, respectively.

5. An image capturing apparatus as claimed in claim 3, wherein said light-receiving unit includes a solid state image sensor, and
   said separation unit includes a first optical filter that transmits light having said first wavelength, a second optical filter that transmits light having said second wavelength and a third optical filter that transmits light having said third wavelength, said first, second and third optical filter being arranged alternately on a light-receiving surface of said solid state image sensor.

6. An image capturing apparatus as claimed in claim 3, wherein said illumination unit includes a first optical filter that transmits light having a shorter wavelength than a first boundary wavelength and a second optical filter that transmits light having a longer wavelength than a second boundary wavelength,
   said illumination unit casts said first illumination light transmitted by said first optical filter and said second illumination light transmitted by said second optical filter from said optically different emission positions onto said subject,
   said separation unit includes first, second and third optical filters that transmits light beams having said first, second and third wavelengths, respectively, said first wavelength being shorter than a shorter one of said first and second boundary wavelengths, said second and third wavelengths being longer than a longer one of said first and second boundary wavelengths, and
   said separation unit separates said first outgoing light beam having said first wavelength by making said outgoing light beams from said subject pass through said first optical filter of said separation unit, and separates said second light beam having said second wavelength and said third outgoing light beam having said third wavelength by making said outgoing light beams from said subject pass through said second and third optical filters of said separation unit.

7. An image capturing apparatus as claimed in claim 3, wherein said depth calculator calculates said depth-direction distance to said subject by using a value based on the intensities of said second and third outgoing light beams and the intensity of said first outgoing light beam.

8. An image capturing apparatus as claimed in claim 7, wherein said depth calculator obtains a dummy intensity of a dummy outgoing light beam from said subject in a case where it is assumed that a light beam having said first wavelength is cast from the emission position of said second illumination light beam, based on the intensities of said second and third outgoing light beams.

9. An image capturing apparatus as claimed in claim 7, wherein said depth calculator calculates said depth-direction distance to said subject by using an averaged intensity of said second and third outgoing light beams and the intensity of said first outgoing light beam.

10. An image capturing apparatus as claimed in claim 2, wherein said illumination unit casts said first illumination light beam mainly having said first wavelength and said second illumination light beam mainly having said second and third wavelengths from the optically different emission positions onto said subject, said second wavelength being shorter than said first wavelength, said third wavelength being longer than said first wavelength, said image capturing apparatus further comprising:
    an optically converging unit operable to converge outgoing light beams from said subject onto which said first and second illumination light beams are cast;
    a separation unit operable to optically separate said outgoing light beams from said subject into a first outgoing light beam having said first wavelength and a second outgoing light beam having said second and third wavelengths;
    a light-receiving unit operable to receive said first and second outgoing light beams converged by said optically converging unit; and
    a light intensity detector operable to detect intensities of said first and second outgoing light beams received by said light-receiving unit,
    wherein said depth calculator calculates the depth-direction distance to said subject by using the intensities of said first and second outgoing light beams.

11. An image capturing apparatus as claimed in claim 10, wherein said light-receiving unit includes two panels of solid state image sensors, and said separation unit optically separates an optical path of said first outgoing light beam from that of said second outgoing light beam by using an optical path splitter to allow said first and second outgoing light beams to be received by said two panels of solid state image sensors, respectively.

12. An image capturing apparatus as claimed in claim 10, wherein said light-receiving unit includes a solid state image sensor, and said separation unit includes a first optical filter that transmits light having said first wavelength and a second optical filter that transmits light having said second and third wavelengths, said first and second optical filters being arranged alternately on a light-receiving surface of said solid state image sensor.

13. An image capturing apparatus as claimed in claim 10, wherein said depth calculator calculates said depth-direction distance to said subject based on a ratio of the intensity of said first outgoing light beam and a half of the intensity of said second outgoing light beam.

14. An image capturing apparatus as claimed in claim 4, wherein an optical axis of said illumination unit when said illumination unit casts said first and second illumination light beams is substantially coincident with an optical axis of said capturing unit when said capturing unit captures said outgoing light beams from said subject.

15. An image capturing apparatus as claimed in claim 14, wherein said light intensity detector detects the intensities of said first and second outgoing light beams in each pixel of an image of said subject captured by said light-receiving unit, and said depth calculator calculates a depth distribution of said subject by obtaining for each pixel said depth to a region of said subject corresponding to said pixel.

16. An image capturing apparatus as claimed in claim 15, wherein said first and second illumination light beam are light beams in an infrared region, said separation unit further includes a device operable to optically separate visible light from said outgoing light beams from said subject, and said light-receiving unit further includes a solid state image sensor for visible light operable to receive said visible light that is optically separated by said separation unit and is converged by said optically converging unit.

17. An image capturing apparatus as claimed in claim 4, further comprising a controller operable to control at least one of emission periods, the intensities, and the emission positions of said first and second illumination light beams cast from said illumination unit and an exposure period of said light-receiving unit, based on at least one of the intensities of said outgoing light beams from said subject detected by said light intensity detector and said depth-direction distance to said subject calculated by said depth calculator.

18. An image capturing apparatus as claimed in claim 5, wherein an optical axis of said illumination unit when said illumination unit casts said first and second illumination light beams is substantially coincident with an optical axis of said capturing unit when said capturing unit captures said outgoing light beams from said subject.

19. An image capturing apparatus as claimed in claim 18, wherein said light intensity detector detects the intensities of said first and second outgoing light beams in each pixel of an image of said subject captured by said light-receiving unit, and said depth calculator calculates a depth distribution of said subject by obtaining for each pixel said depth to a region of said subject corresponding to said pixel.

20. An image capturing apparatus as claimed in claim 19, wherein said first and second illumination light beam are light beams in an infrared region, said separation unit further includes a device operable to optically separate visible light from said outgoing light beams from said subject, and said light-receiving unit further includes a solid state image sensor for visible light operable to receive said visible light that is optically separated by said separation unit and is converged by said optically converging unit.

21. An image capturing apparatus as claimed in claim 5, further comprising a controller operable to control at least one of emission periods, the intensities, and the emission positions of said first and second illumination light beams cast from said illumination unit and an exposure period of said light-receiving unit, based on at least one of the intensities of said outgoing light beams from said subject detected by said light intensity detector and said depth-direction distance to said subject calculated by said depth calculator.

22. An image capturing apparatus as claimed in claim 6, wherein an optical axis of said illumination unit when said illumination unit casts said first and second illumination light beams is substantially coincident with an optical axis of said capturing unit when said capturing unit captures said outgoing light beams from said subject.

23. An image capturing apparatus as claimed in claim 22, wherein said light intensity detector detects the intensities of said first and second outgoing light beams in each pixel of an image of said subject captured by said light-receiving unit, and said depth calculator calculates a depth distribution of said subject by obtaining for each pixel said depth to a region of said subject corresponding to said pixel.

24. An image capturing apparatus as claimed in claim 23, wherein said first and second illumination light beam are light beams in an infrared region, said separation unit further includes a device operable to optically separate visible light from said outgoing light beams from said subject, and said light-receiving unit further includes a solid state image sensor for visible light operable to receive said visible light that is optically separated by said separation unit and is converged by said optically converging unit.

25. An image capturing apparatus as claimed in claim 6, further comprising a controller operable to control at least one of emission periods, the intensities, and the emission positions of said first and second illumination light beams cast from said illumination unit and an exposure period of said light-receiving unit, based on at least one of the intensities of said outgoing light beams from said subject detected by said light intensity detector and said depth-direction distance to said subject calculated by said depth calculator.

26. An image capturing apparatus as claimed in claim 11, wherein an optical axis of said illumination unit when said illumination unit casts said first and second illumination light beams is substantially coincident with an optical axis of said capturing unit when said capturing unit captures said outgoing light beams from said subject.

27. An image capturing apparatus as claimed in claim 26, wherein said light intensity detector detects the intensities of said first and second outgoing light beams in each pixel of an image of said subject captured by said light-receiving unit, and said depth calculator calculates a depth distribution of said subject by obtaining for each pixel said depth to a region of said subject corresponding to said pixel.

28. An image capturing apparatus as claimed in claim 27, wherein said first and second illumination light beam are light beams in an infrared region, said separation unit further includes a device operable to optically separate visible light from said outgoing light beams from said subject, and said light-receiving unit further includes a solid state image sensor for visible light operable to receive said visible light that is optically separated by said separation unit and is converged by said optically converging unit.

29. An image capturing apparatus as claimed in claim 11, further comprising a controller operable to control at least one of emission periods, the intensities, and the emission positions of said first and second illumination light beams cast from said illumination unit and an exposure period of said light-receiving unit, based on at least one of the intensities of said outgoing light beams from said subject detected by said light intensity detector and said depth-direction distance to said subject calculated by said depth calculator.

30. An image capturing apparatus as claimed in claim 12, wherein an optical axis of said illumination unit when said illumination unit casts said first and second illumination light beams is substantially coincident with an optical axis of said capturing unit when said capturing unit captures said outgoing light beams from said subject.

31. An image capturing apparatus as claimed in claim 30, wherein said light intensity detector detects the intensities of said first and second outgoing light beams in each pixel of an image of said subject captured by said light-receiving unit, and said depth calculator calculates a depth distribution of said subject by obtaining for each pixel said depth to a region of said subject corresponding to said pixel.

32. An image capturing apparatus as claimed in claim 31, wherein said first and second illumination light beam are light beams in an infrared region, said separation unit further includes a device operable to optically separate visible light from said outgoing light beams from said subject, and said light-receiving unit further includes a solid state image sensor for visible light operable to receive said visible light that is optically separated by said separation unit and is converged by said optically converging unit.

33. An image capturing apparatus as claimed in claim 12, further comprising a controller operable to control at least one of emission periods, the intensities, and the emission positions of said first and second illumination light beams cast from said illumination unit and an exposure period of said light-receiving unit, based on at least one of the intensities of said outgoing light beams from said subject detected by said light intensity detector and said depth-direction distance to said subject calculated by said depth calculator.

34. A distance measuring method for obtaining information regarding a depth of a subject, comprising:

an illumination step of casting a first illumination light beam mainly having a first wavelength and a second illumination light beam mainly having second and third wavelengths from optically different emission positions onto said subject simultaneously, said second and third wavelengths being different from said first wavelength;

a separation step of separating outgoing light beams obtained from said subject that is illuminated with said first and second illumination light beams into a first outgoing light beam having said first wavelength, a second outgoing light beam having said second wavelength and a third outgoing light beam having said third wavelength;

a capturing step of capturing said first, second and third outgoing light beam that are separated;

a light intensity detection step of detecting intensities of said first, second and third outgoing light beams that are captured; and a depth calculation step of calculating a depth-direction distance to said subject by using the intensities of said first, second and third outgoing light beams.

35. A distance measuring method as claimed in claim 34, wherein in said depth calculation step said depth-direction distance to said subject is calculated by using a value based on the intensities of said second and third outgoing light beams and the intensity of said first outgoing light beam.

36. A distance measuring method as claimed in claim 35, wherein in said depth calculation step a dummy intensity of a dummy outgoing light beam from said subject in a case where it is assumed that a light beam having said first wavelength is emitted from the emission position of said second illumination light beam is obtained based on the intensities of said second and third outgoing light beams, and said depth-direction distance to said subject is calculated based on a ratio of the intensity of said first outgoing light beam and said dummy intensity.

37. A distance measuring method as claimed in claim 35, wherein said depth-direction distance to said subject is calculated based on a ratio of an averaged intensity of said second and third outgoing light beams and the intensity of said first outgoing light beam.

38. A distance measuring method for obtaining information regarding a depth of a subject, comprising:

an illumination step of casting a first illumination light beam mainly having a first wavelength and a second illumination light beam mainly having a second wavelength and a third wavelength from optically different emission positions onto said subject, said second wavelength being shorter than said first wavelength, said third wavelength being longer than said first wavelength;

a separation step of optically separating outgoing light beams from said subject onto which said first and second illumination light beams are cast into a first outgoing light beam having said first wavelength and a second outgoing light beam having said second and third wavelengths;

a capturing step of capturing said first and second outgoing light beams separated from each other;

a light intensity detection step of detecting intensities of said first and second outgoing light beams;

a depth calculation step of calculating a depth-direction distance to said subject by using the intensities of said first and second outgoing light beams.

39. A distance measuring method as claimed in claim 38, wherein in said depth calculation step said depth-direction distance is calculated based on a ratio of the intensity of said first outgoing light beam and a half of the intensity of said second outgoing light beam.

40. An information obtaining method for obtaining distance information indicative of a distance to an object, comprising:

an illumination step of casting light beams onto said object from optically different two illumination positions;

a capturing step of capturing said light beams reflected from said object;

an angle calculation step of calculating one of angles at which said light beams are cast onto said object from said optically different two illumination positions; and a calculation step of calculating distance information indicative of a distance to a measured portion of said object based on reflected light beams from said measured portion of and reflected light beams from a region in the vicinity of said measured portion of said object both of which are captured in said capturing step.

41. An information obtaining method as claimed in claim 40, wherein, in said calculation step, said distance information indicating said distance to said measured portion and surface-inclination information indicating inclination of a surface of said measured portion are calculated based intensities of said reflected light beams from said measured portion and intensities of said reflected light beams from said region in the vicinity of said measured portion.

42. An information obtaining method as claimed in claim 41, wherein said calculation step comprises:
- a first calculation step of calculating said surface-inclination information of said measured portion to be obtained in a case where assumed distance information for said measured portion indicating an assumed distance to said measured portion is considered, based on the intensities of said reflected light beams from said measured portion and an incident angle of said reflected light beams;
- a second calculation step of calculating assumed distance information for said region in the vicinity of said measured portion that indicates an assumed distance to said region, based on said assumed distance information for said measured portion and said surface-inclination information of said measured portion;
- a third calculation step of calculating surface-inclination information of said region in the vicinity of said measured portion based on said assumed distance information for said region, the intensities of said reflected light beams from said region and an incident angles of said reflected light beams; and
- a fourth calculation step of calculating an error between said surface-inclination information of said measured portion and said surface-inclination information of said region in the vicinity of said measured portion, and wherein said assumed distance information for said measured portion is output as actual distance information for said measured portion in a case where said error falls within a predetermined range.

43. An information obtaining method for obtaining distance information indicative of a distance to an object, comprising:
- an illumination step of casting light beams onto said object from optically different three or more illumination positions;
- a capturing step of capturing said light beams reflected from said object; and
- a calculation step of calculating said distance information based on said reflected light beams captured in said capturing step.

44. An information obtaining method as claimed in claim 43, wherein said reflected light beams are captured at a position that is optically the same as one of said three or more illumination positions in said capturing step.

45. An information obtaining method as claimed in claim 44, wherein said three or more illumination positions are arranged on optically the same line.

46. An information obtaining method for obtaining distance information indicative of a distance to an object, comprising:
- an illumination step of casting light beams onto said object from optically different three or more illumination positions;
- a capturing step of capturing said light beams reflected from said object;
- an angle-equalizing step of equalizing a first angle of said captured light beam reflected from said object with respect to an optical axis of a device capturing said reflected light beam substantially with a second angle of said casted light beam, wherein the light beam is casted onto said object from one of said three or more illumination positions with respect to the optical axis of the device; and
- a calculation step of calculating said distance information based on said reflected light beams captured.

* * * * *